United States Patent [19]

Brackett

[11] Patent Number: 5,546,821
[45] Date of Patent: *Aug. 20, 1996

[54] MOTION ARRESTER FOR A CONJUGATE DRIVE MECHANISM

[76] Inventor: Douglas C. Brackett, 2535 Mason Oaks Dr., Valricho, Fla. 33594

[*] Notice: The term of this patent shall not extend beyond the expiration date of Pat. No. 5,351,567.

[21] Appl. No.: 317,238

[22] Filed: Oct. 3, 1994

Related U.S. Application Data

[63] Continuation-in-part of Ser. No. 148,492, Nov. 8, 1993, Pat. No. 5,351,567.

[51] Int. Cl.⁶ .................................................... F16H 21/18
[52] U.S. Cl. ......................................... 74/49; 74/50
[58] Field of Search ............................................ 74/49, 50

[56] References Cited

U.S. PATENT DOCUMENTS

| | | | |
|---|---|---|---|
| 19,726 | 3/1858 | Van Doren | 74/32 |
| 116,617 | 7/1871 | McCamy | 74/32 |
| 130,371 | 8/1872 | Hendryx | 74/49 |
| 139,499 | 6/1873 | Doolittle | 74/44 |
| 283,558 | 8/1883 | Baumgarten | 91/354 |
| 347,644 | 8/1886 | Salmon | 70/429 |
| 410,432 | 9/1889 | McKaig | 92/136 |
| 508,387 | 11/1893 | Humphries | 74/32 |
| 637,450 | 11/1899 | Doolittle | 123/294 |
| 671,583 | 4/1901 | Carmack | 74/32 |
| 735,743 | 8/1903 | Fowler | 384/597 |
| 762,646 | 6/1904 | Morison | 74/49 |
| 813,736 | 2/1906 | Pendleton | 74/50 |
| 999,220 | 8/1911 | Harmon | 417/455 |
| 1,151,220 | 8/1915 | Scherling | 74/435 |
| 1,156,055 | 10/1915 | Bullock | 74/435 |
| 1,508,614 | 9/1924 | Powell | 123/66 |
| 1,825,096 | 9/1931 | Schwenlein . | |
| 2,312,057 | 2/1943 | Williams | 74/49 |
| 2,583,050 | 1/1952 | Harrower | 251/250.5 |
| 2,628,602 | 2/1953 | Butterfield | 123/41.35 |
| 2,797,589 | 7/1957 | Chaveneaud | 74/436 |
| 3,195,420 | 7/1965 | Johannsen . | |
| 3,332,303 | 7/1967 | Daugherty | 192/138 |
| 3,901,100 | 8/1975 | Iida | 74/530 |
| 3,945,358 | 3/1976 | Collins | 123/50 A |
| 4,173,845 | 11/1979 | Heesch | 49/350 |
| 4,270,395 | 6/1981 | Grundy | 74/49 |
| 4,573,373 | 3/1986 | Shimizu | 74/468 |
| 4,590,812 | 5/1986 | Brackett | 74/55 |
| 4,685,342 | 8/1987 | Brackett | 74/50 |
| 4,722,239 | 2/1988 | Fleck | 74/435 |
| 4,779,472 | 10/1988 | Brackett | 74/50 |
| 4,856,917 | 8/1989 | Schroder et al. . | |
| 4,915,019 | 4/1990 | Hovagnimian | 92/136 |
| 4,932,373 | 6/1990 | Carson | 123/197.4 |
| 5,109,728 | 5/1992 | Muszak | 74/820 |
| 5,259,256 | 11/1993 | Brackett | 74/49 |
| 5,351,567 | 10/1994 | Brackett | 74/49 |

FOREIGN PATENT DOCUMENTS 61-241518  10/1986  Japan .

OTHER PUBLICATIONS

International Publication No. WO/94/03740 17 Feb., 1994, Douglas C. Brackett.

*Primary Examiner*—Charles A. Marmor
*Assistant Examiner*—David Fenstermacher
*Attorney, Agent, or Firm*—Selitto & Associates

[57] ABSTRACT

A conjugate drive mechanism of a motion converter includes a conjugate driver, which is rotatably mounted on a crankpin, and a bearing conjugate, which is mounted on a linearly movable shuttle. The conjugate driver moves relative to the bearing conjugate between a pair of end points. A motion arrester functions to arrest the motion of the conjugate driver as it reaches each of its end points of travel relative to the bearing conjugate. The conjugate driver has a tracking profile which is in continuous conjugating engagement with a trackable profile provided on the bearing conjugate and having the same circumferential length as the tracking profile of the conjugate driver.

49 Claims, 12 Drawing Sheets

5,546,821

MOTION ARRESTER FOR A CONJUGATE DRIVE MECHANISM

CROSS REFERENCE TO RELATED APPLICATION

This is a continuation-in-part of application Ser. No. 08/148,492, filed Nov. 8, 1993, now U.S. Pat. No. 5,351,567.

FIELD OF THE INVENTION

The present invention relates to motion arresters for maximizing the efficiency of a conjugate drive type motion converter, and, more particularly, a motion arrester for improving the effectiveness of a conjugate drive mechanism. As used herein, the term "conjugate drive mechanism" shall connote a combination of at least two mechanical components (i.e., a "conjugate driver" and a "bearing conjugate" a/k/a "conjugate bearing") adapted to mesh or engage in conjugation with each other throughout the range of motion of the mechanism, such as through the provision of meshable tracking profiles (i.e., undulations), during the operation of an associated motion converter which functions to convert rotary motion to rectilinear motion and vice versa without any clearance between the mechanical components.

BACKGROUND OF THE INVENTION

The scotch yoke has been used for many years as a means for converting reciprocating linear movement to rotary motion and vice versa. It has found application in a variety of machines, such as motors, pumps, and compressors which utilize a piston articulated within a closed cylinder (see, e.g., U.S. Pat. Nos. 283,558; 813,736; 999,220; and 2,628,602), as well as in compactors, pumps, punch presses, robots, sewing machines, generators, and material handlers.

The essential components of a scotch yoke are a crankpin rotated about a crankshaft center at an axial offset and a shuttle having a slot therein through which the crankpin is positioned. The motion of the shuttle is constrained to a linear path by a guide, frequently, a pair of opposing parallel guide surfaces. The crankshaft and crankpin move in rotary motion and may be either the driven elements or the driving elements. The shuttle moves in rectilinear motion and likewise may be the driven element or the driving element. Thus, the scotch yoke provides a means for converting linear to rotary motion and vice versa.

The slot within the shuttle must be at least as wide as the crankpin diameter and long enough to accommodate the crankpin dimension and its travel. A pair of competing objectives in the design of scotch yokes is to eliminate friction, as well as clearance, at the crankpin/slot interface. Friction results in energy loss in the conversion from linear to rotary motion or vice versa and also in wear of the scotch yoke. Clearance at the interface results in a loss of motion translation, commonly called "backlash", when converting from rotary to linear motion and vice versa (i.e., there is no translation during traversal of the clearance gap), and in brinelling, spalling and vibrations when the unrestrained driving element accelerates across the clearance gap and collides into the driven element. As has been recognized for many years, the consequences of clearance and friction at the slot/crankpin interface are energy inefficiency and excessive wear and tear.

U.S. Pat. No. 4,685,342 to Douglas C. Brackett, the inventor herein, discloses a scotch yoke device having a pair of opposing, offset bearing surfaces, one on either side of the crankpin slot in the shuttle. A corresponding pair of roller bearings are arranged on the crankpin coaxially and laterally displaced from one another such that each aligns with one of the pair of opposing, offset bearing surfaces of the slot within which the crankpin is positioned. While the device disclosed in the Brackett '342 Patent minimizes clearance at the crankpin/slot interface to that attributable to manufacturing tolerances and also reduces friction between the crankpin and the shuttle slot to the rolling friction of a roller bearing, these advantages are realized without providing the device with means adapted to minimize backlash which may be present at each end of the range of motion of the roller bearings relative to their associated bearing surfaces.

SUMMARY OF THE INVENTION

The present invention relates to a motion arrester for a conjugate drive mechanism of a motion converter which includes a rotatable crankshaft having a crankpin, a conjugate driver rotatably mounted on the crankpin, and a bearing conjugate mounted on a linearly movable shuttle such that the bearing conjugate is in continuous conjugating engagement with the conjugate driver between a pair of end points. The motion arrester, which may, for example, include a pair of stop pads provided on the conjugate driver and/or the bearing conjugate, functions to arrest the motion of the conjugate driver relative to the bearing conjugate when the conjugate driver reaches each of its end points of motion. The motion arrester thereby minimizes any backlash which may be present at each end of the range of motion of the conjugate driver relative to the bearing conjugate, whereby the present invention enhances the energy efficiency and wear resistance properties of the conjugate drive mechanism.

The conjugate driver has a tracking profile which is in continuous conjugating engagement with a trackable profile provided on the bearing conjugate. The tracking profile of the conjugate driver has the same circumferential length as the trackable profile of the bearing conjugate.

BRIEF DESCRIPTION OF THE DRAWINGS

For a better understanding of the present invention, reference is made to the following description of various exemplary embodiments of the invention considered in conjunction with the accompanying drawings, in which.

DESCRIPTION OF THE EXEMPLARY EMBODIMENTS

Although the present invention can be used with any conjugate drive mechanism, it is particularly suitable for use in connection with conjugate drive mechanisms adapted for use in motion converters disclosed in Brackett U.S. Pat. Nos. 4,685,342 and 5,259,256. Accordingly, the present invention will be described hereinafter in connection with conjugate drive mechanisms adapted for use in combination with such motion converters. It should be understood, however, that the following description is only meant to be illustrative of the present invention and is not meant to limit the scope of the present invention, which has applicability to other types of motion converters.

Figure 1:
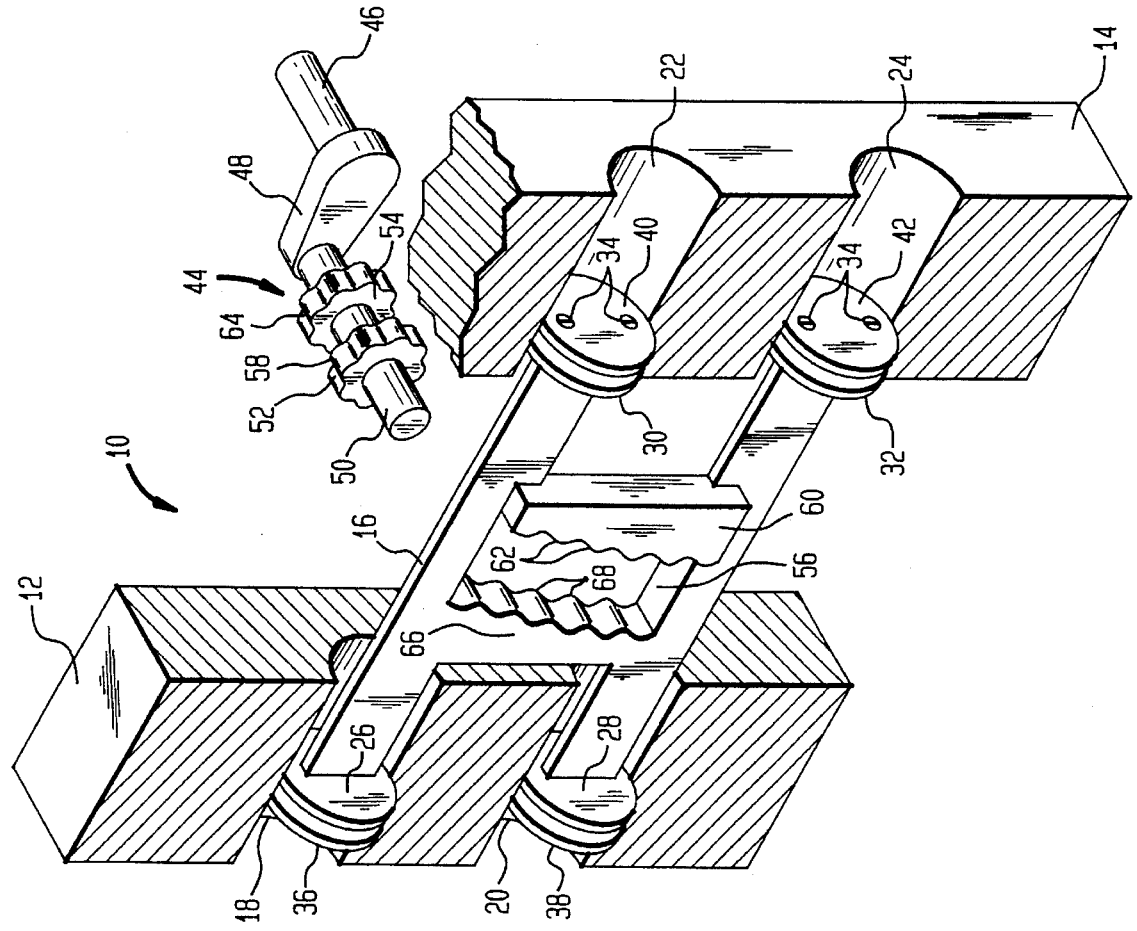
FIG. 1 is an exploded perspective view of a piston engine incorporating a motion converter which is equipped with a first exemplary embodiment of a motion arrester constructed in accordance with the present invention.

FIG. 1 show a piston engine 10 constructed in accordance with the teachings of Brackett U.S. Pat. No. 4,685,342, the specification of which is incorporated herein by reference, and is equipped with a conjugate drive mechanism (also referred to herein as "conjugate drive", as that term will be more fully defined hereinafter). The piston engine 10 includes a pair of cylinder blocks 12, 14 and a piston shuttle 16. The cylinder block 12 is provided with a pair of cylinders 18, 20, while the cylinder block 14 is provided with a pair of cylinders 22, 24. The shuttle 16 includes a first pair of pistons 26, 28 mounted for reciprocating linear motion in the cylinders 18, 20, respectively, and a second pair of pistons 30, 32 mounted for reciprocating linear motion in the cylinders 22, 24, respectively. The pistons 26, 28, 30, 32 are fastened to the shuttle 16, by screws 34, which are threadedly received in holes (not shown) provided in faces 36, 38, 40, 42 of the pistons 26, 28, 30, 32, respectively, and extending into the shuttle 16.

A crank 44 is operatively associated with the shuttle 16. More particularly, the crank 44 includes a crankshaft 46, a crankarm 48 mounted for conjoint rotation with the crankshaft 46, and a crankpin 50 mounted for conjoint rotation with the crankshaft 46, the crankpin 50 and the crankshaft 46 being offset relative to each other. Conjugate drivers 52, 54 are rotatably mounted on the crankpin 50, which extends through a slot 56 provided in the shuttle 16 such that the conjugate driver 52, which includes a circumferential tracking profile (i.e., undulations) (also referred to herein as "trackable profile") 58, is in constant engagement with a bearing conjugate 60, which includes a circumferential mating profile (i.e., undulations) (also referred to herein as "trackable profile") 62, located on one side of the shuttle 16 and such that the conjugate driver 54, which includes a circumferential tracking profile (i.e., undulations) (also referred to herein as "trackable profile") 64, is in constant engagement with a bearing conjugate 66, which includes a circumferential mating profile (i.e., undulations) (also referred to herein as "trackable profile") 68, located on an opposite side of the shuttle 16. The conjugate drivers 52, 54 and the bearing conjugates 60, 66, respectively, mesh together in conjugation throughout the range of motion of the piston engine 10; and, thus, they cooperate to form a conjugate drive mechanism as that term is defined herein. The conjugate drive mechanism of FIG. 1 shares the same attributes of a conjugate drive mechanism employed in a piston engine of FIGS. 4–8. Thus, such attributes will become apparent after the description of the conjugate drive mechanism of FIGS. 4–8 is considered hereinafter in conjunction with FIGS. 10–14.

Figure 2:
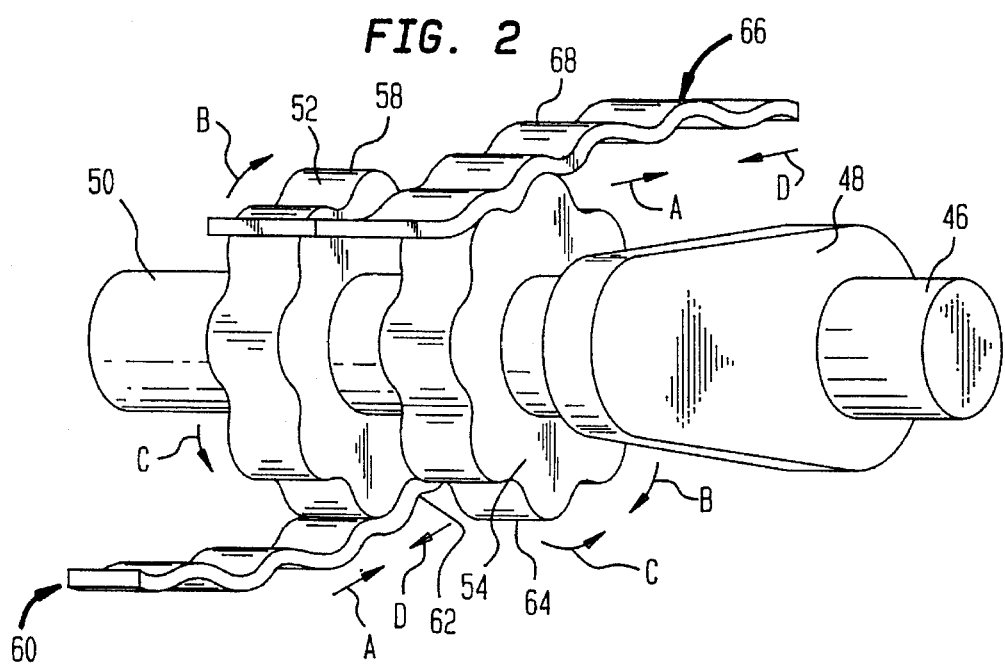
FIG. 2 is an enlarged perspective view of a portion of the motion converter shown in FIG. 1.

In operation, as the pistons 26, 28, 30, 32 reciprocate linearly in the cylinders 18, 20, 22, 24, respectively, the conjugate drivers 52, 54 move back and forth along the bearing conjugates 60, 66, respectively. More particularly, as the conjugate drivers 52, 54 move in conjugation (i.e., mesh) along the bearing conjugates 60, 66, respectively, in a first direction (indicated by arrows A in FIG. 2), the conjugate driver 52 rotates in one arcuate direction (indicated by arrows B in FIG. 2) and the conjugate driver 54 rotates in an opposite arcuate direction (indicated by arrows C in FIG. 2). As the conjugate drivers 52, 54 move along the bearing conjugates 60, 66, respectively, in a second direction (indicated by arrows D in FIG. 2), the conjugate driver 52 rotates in the arcuate direction indicated by the arrows C and the conjugate driver 54 rotates in the arcuate direction indicated by the arrows B. Because the conjugate drivers 52, 54 are in constant engagement with the bearing conjugates 60, 66, respectively, as the conjugate drivers 52, 54 move back and forth along the bearing conjugates 60, 66, respectively, the linear motion of the shuttle 16 is continuously converted into the rotary motion of the crank 44 to thereby reduce backlash.

Figure 3A:
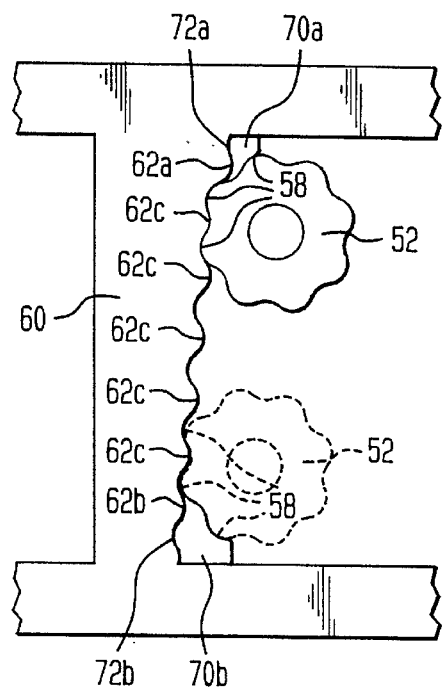
FIGS. 3a and 3b are a series of schematic front elevational views of the first exemplary embodiment as the motion converter of FIGS. 1 and 2 is moved through a portion of its range of motion.

Referring to FIG. 3a, the conjugate driver 52 has a pre-defined range of movement relative to the bearing conjugate 60, the range being delimited by two end points: one of which is represented by the solid line representation of the conjugate driver 52 and the other of which is represented by the broken line representation of the conjugate driver 52. More particularly, the bearing conjugate 60 has exterior undulations 62a, 62b and interior undulations 62c, which mesh with the undulations 58 of the conjugate driver 52. Stop pads 70a, 70b are provided on surfaces 72a, 72b, respectively, of the exterior undulations 62a, 62b, respectively. The stop pads 70a, 70b modify the profiles of the exterior undulations 62a, 62b so as to create increased surface engagement with their corresponding undulations 58 of the conjugate driver 52, thereby arresting the motion of the conjugate driver 52 and inhibiting it from moving beyond either of its end points and, as a result, reducing backlash and scuffing when the conjugate driver 52 reaches such end points. In other words, the stop pads 70a, 70b provide improved contact between the bearing conjugate 60 and the conjugate driver 52 at the end points, thereby increasing the effectiveness of the conjugate drive mechanism.

The stop pads 70a, 70b can be made from a material which is the same as or different from that of the bearing conjugate 60 and/or the conjugate driver 52 and can be separate elements which are permanently and fixedly attached to the bearing conjugate 60. Alternatively, the stop pads 70a, 70b can be separate elements which are permanently and fixedly attached to the conjugate driver 52 or to the bearing conjugate 60 and conjugate driver 52, provided that the conjugate driver 52 makes less than a complete revolution when it moves back and forth along the bearing conjugate 60. The stop pads 70a, 70b can also be made integrally with the bearing conjugate 60 and/or with the conjugate driver 52. Further, the stop pads 70a, 70b can be removably attached to the bearing conjugate 60 and/or to the conjugate driver 52 so that the stop pads 70a, 70b can be removed for repair, replacement, etc. In addition, the stop pads 70a, 70b can be made adjustable by any conventional means to compensate for any wear of the stop pads 70a, 70b and/or the conjugate driver 52.

Figure 3B:
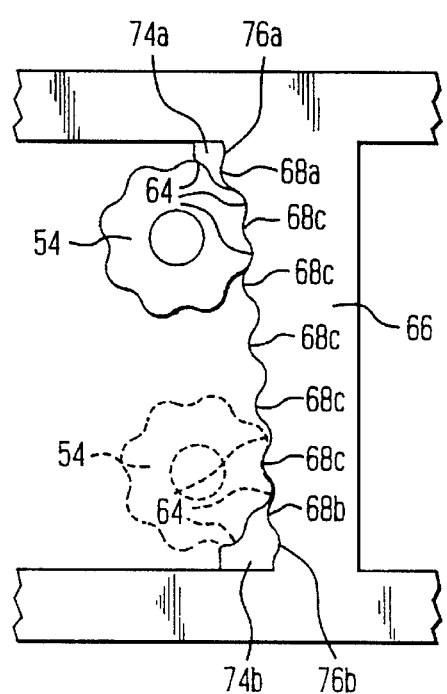

Referring to FIG. 3b, the conjugate driver 54 has a pre-defined range of movement relative to the bearing conjugate 66, the range being delimited by two end points: one of which is represented by the solid line representation of the conjugate driver 54 and the other of which is represented by the broken line representation of the conjugate driver 54. More particularly, the bearing conjugate 66 has exterior undulations 68a, 68b and interior undulations 68c, which mesh with the undulations 64 of the conjugate driver 54. Stop pads 74a, 74b are provided on surfaces 76a, 76b, respectively, of the exterior undulations 68a, 68b, respectively. The stop pads 74a, 74b modify the profiles of the undulations 68a, 68b so as to create increased surface engagement with their corresponding undulations 64 of the conjugate driver 54 at the end points, thereby arresting the motion of the conjugate driver 54 and inhibiting it from moving beyond either of its end points and, as a result, reducing backlash and scuffing when the conjugate driver 54 reaches such end points. In other words, the stop pads 74a, 74b provide improved contact between the bearing conjugate 66 and the conjugate driver 54, thereby increasing the effectiveness of the conjugate drive mechanism.

The stop pads 74a, 74b can be made from a material which is the same as or different from that of the bearing conjugate 66 and/or the conjugate driver 54 and can be separate elements which are permanently and fixedly attached to the bearing conjugate 66. Alternatively, the stop pads 74a, 74b can be separate elements which are permanently and fixedly attached to the conjugate driver 54 or to the bearing conjugate 66 and conjugate driver 54, provided that the conjugate driver 54 makes less than a complete revolution when it moves back and forth along the bearing conjugate 66. The stop pads 74a, 74b can also be made integrally with the bearing conjugate 66 and/or with the conjugate driver 54. Further, the stop pads 74a, 74b can be removably attached to the bearing conjugate 66 and/or to the conjugate driver 54 so that the stop pads 74a, 74b can be removed for repair, replacement, etc. In addition, the stop pads 74a, 74b can be made adjustable by any conventional means to compensate for any wear of the stop pads 74a, 74b and/or the conjugate driver 54.

As can be seen from a comparison of FIGS. 3a and 3b, the conjugate driver 52 engages the stop pad 70a at the same time that the conjugate driver 54 engages the stop pad 74a. Similarly, the conjugate driver 52 engages the stop pad 70b at the same time that the conjugate driver 54 engages the stop pad 74b. The motion of conjugate driver 52 and the motion of the conjugate driver 54 are, therefore, arrested simultaneously at each of the end points.

Figure 4:
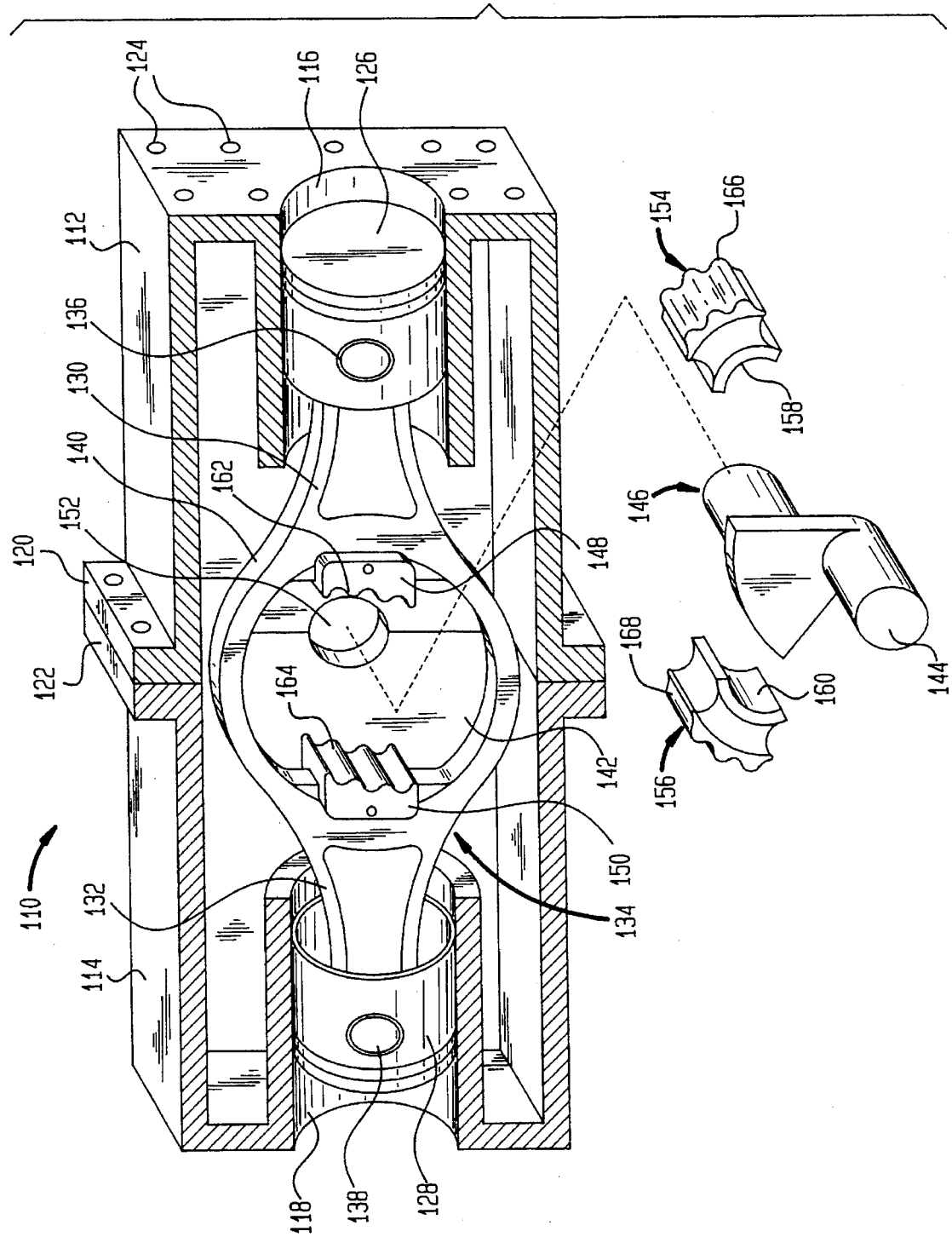
FIG. 4 is an exploded perspective view of a reciprocating piston device incorporating a motion converter which is equipped with a second exemplary embodiment of a motion arrester constructed in accordance with the present invention.

FIG. 4 shows a piston engine 110 constructed in accordance with the teachings of Brackett U.S. Pat. No. 5,259,256, the specification of which is incorporated herein by reference. The piston engine 110 comprises a pair of cylinder blocks 112, 114, each of which has a cylinder bore 116 and 118, respectively. The cylinder blocks 112, 114 would be joined together via opposing flanges 120, 122 by bolts etc. or by studs extending through the blocks and projecting from holes 124 for securing a cylinder head (not shown) via suitable nuts (not shown) as would be conventional in constructing cylinder blocks with opposed cylinders. The cylinder bores 116 and 118 receive corresponding pistons 126 and 128 which are mounted upon the terminal ends of extensions 130 and 132 of shuttle 134 by wrist pins 136 and 138 or other conventional means. The extensions 130 and 132 emanate from a common yoke portion 140 of the shuttle 134.

The yoke portion 140 is provided with an aperture 142 which accommodates a crankpin 144 of crankshaft 146. The internal peripheral boundary of the aperture 142, instead of simply being a smooth slot, includes a pair of bearing conjugates 148 and 150 on either side thereof. In the embodiment depicted, the bearing conjugates 148, 150 are a pair of discrete elements, each being bolted to the shuttle 134 on opposing sides of the aperture 142. Alternatively, the bearing conjugates 148, 150 could be defined by an apertured plate or plates secured to or integrated with the shuttle 134, the aperture being formed such that the interior periphery defines the bearing conjugates 148, 150. It should be appreciated that while the aperture 142 passes completely through the shuttle 134, it is possible to replace the aperture 142 with a recess or blind hole. For example, in the device shown in FIG. 4, if the yoke portion 140 were closed by a continuous metal surface on the side closest to the viewer, a recess facing toward bearing opening 152 would be formed. This recess could accommodate the free end of the crankpin 144. The use of the aperture 142 is beneficial because it permits the crankshaft 146 to project through the shuttle 134, whereby additional bearings and crankpins may be made a part thereof, such as, for example, to cooperate with another set of adjacent pistons.

The crankpin 144 has a pair of conjugate drivers 154, 156 rotatably associated therewith when the crankshaft 146 is in place in the bearing opening 152, as is more clearly shown in FIGS. 5–8. With the crankshaft 146 positioned within the opening 152 and the crankpin 144, including the conjugate drivers 154 and 156, positioned within the aperture 142 of the yoke portion 140, the conjugate drivers 154, 156 mesh with the bearing conjugates 148, 150, respectively, which capture the crankpin 144 and the conjugate drivers 154, 156 therebetween. The crankpin 144 is isolated from contact with the periphery of the yoke portion 140 and instead bears upon bearing surfaces 158, 160 of the conjugate drivers 154, 156, respectively. As can be appreciated, this arrangement prevents the crankpin 144 from bearing upon the yoke portion 140 directly and permits the fitting of the crankpin 144 to the aperture 142 within manufacturing tolerances. As can be seen in FIGS. 5–8, the bearing conjugates 148, 150, which include mating profiles or undulations (also referred to herein as "trackable profiles") 162, 164, respectively, formed on tracking surfaces thereof, and the conjugate drivers 154, 156, which include tracking profiles or undulations (also referred to herein as "trackable profiles") 166, 168, respectively, formed on tracking surfaces thereof, mesh together in conjugation throughout the range of motion of the piston engine 110; and, thus, they cooperate to form a conjugate drive mechanism as that term is defined herein. It should be noted that the present invention is not intended to be directed to traditional involute gearing with tip/root clearance. FIGS. 4–8 depict concentric, tri-lobed, conjugate drivers and bearing conjugates which have a pitch line inclined from the perpendicular of the direction of reciprocating motion. Numerous other configurations for the conjugate drivers and the bearing conjugates may be selected, as described at length in the Brackett '256 Patent.

Figure 9:
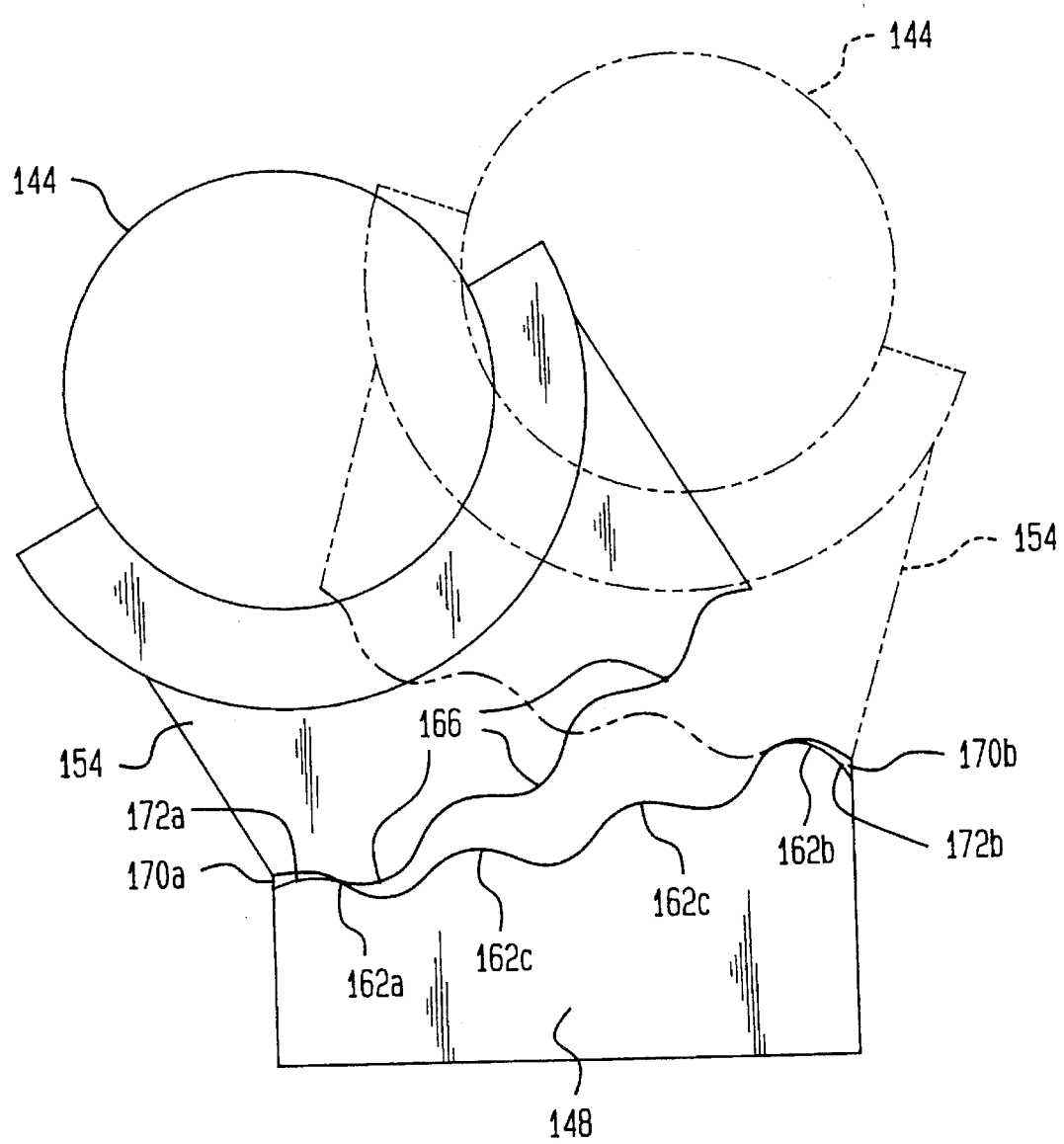
FIG. 9 is an enlarged front elevational view of a portion of the motion converter shown in FIG. 4.

Referring to FIG. 9, the conjugate driver 154 has a pre-defined range of pivotal movement relative to the bearing conjugate 148, the range being delimited by two end points: one of which is represented by the solid line representation of the conjugate driver 154 and the other of which is represented by the broken line representation of the conjugate driver 154. More particularly, the bearing conjugate 148 has exterior undulations 162a, 162b and interior undulations 162c, which mesh with the undulations 166 of the conjugate driver 154. Stop pads 170a, 170b are provided on surfaces 172a, 172b, respectively, of the exterior undulations 162a, 162b, respectively. The stop pads 170a, 170b modify the profiles of the exterior undulations 162a, 162b so as to create increased surface engagement with their corresponding undulations 166 of the conjugate driver 154 at the end points, thereby arresting the motion of the conjugate driver 154 and inhibiting it from moving beyond either of its end points and, as a result, reducing backlash and scuffing when the conjugate driver 154 reaches such end points. In other words, the stop pads 170a, 170b provide improved contact between the bearing conjugate 148 and the conjugate driver 154, thereby increasing the effectiveness of the conjugate drive mechanism.

Figure 5:
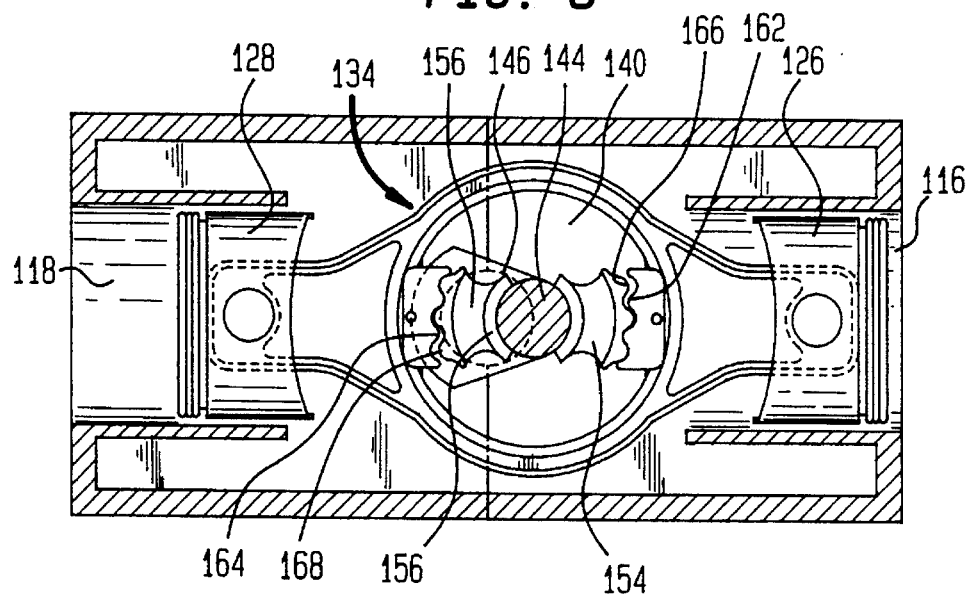
FIGS. 5–8 are series of schematic front elevational views of the second exemplary embodiment as the motion converter of FIG. 4 is moved through a portion of its range of motion.
Figure 6:
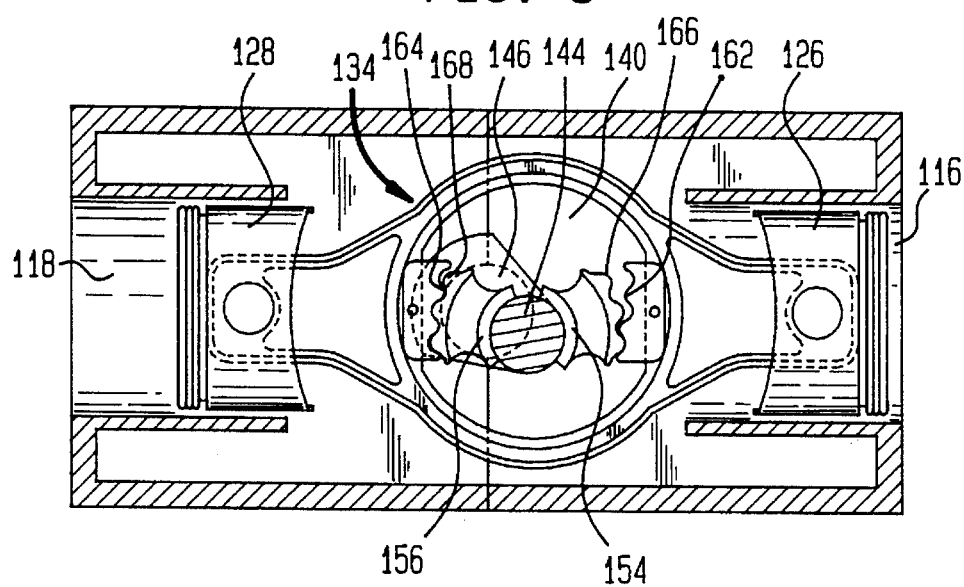
Figure 7:
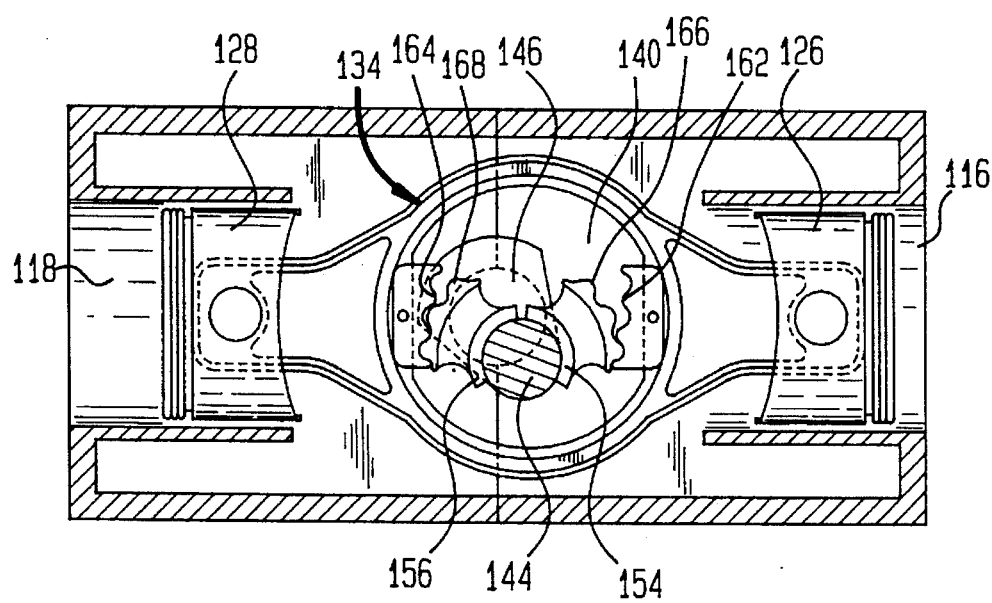
Figure 8:
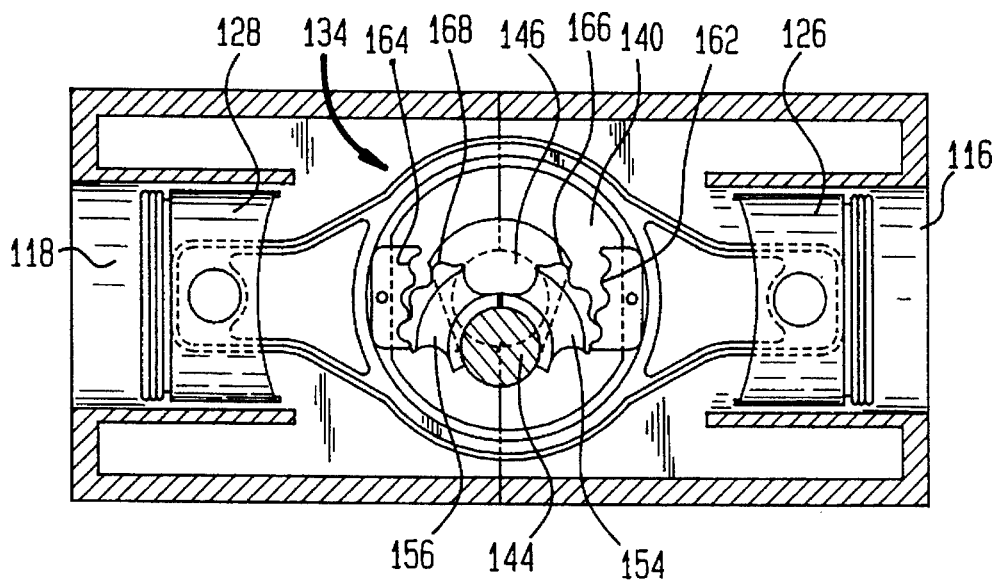

FIGS. 5–8 show the piston engine 110 at four different positions during the travel of the crankshaft 146 through ninety degrees of rotation. FIG. 5 shows the crankpin 144 at 0 or 360 degrees relative to the axis of the cylinders 116, 118. FIG. 6 shows the crankpin 144 at 30 degrees. In FIG. 7, the crankpin 144 is at 60 degrees; and in FIG. 8, the crankpin 144 is at 90 degrees.

As the crankshaft 146 rotates, the crankpin 144 moves up and down within the yoke portion 140 relative to the axis of the cylinders 116, 118 (i.e., in a vertical direction). The horizontal component of crankpin 144 motion is translated into the rectilinear motion of the shuttle 134. The crankpin 144 is captured between the bearing surfaces 158, 160 of the conjugate drivers 154, 156 and is therefore prevented from contacting the interior periphery of the aperture 142. The conjugate drivers 154, 156 pivot about the crankpin 144 as the crankshaft 146 rotates, the bearing conjugates 148, 150 being immovable in the direction perpendicular to the linear path of the shuttle 134 and the pistons 126, 128. The conjugate drivers 154, 156 pivot in opposite directions and can therefore be said to be counter-rotating. The crankpin 144, assuming that it has an axial offset "r" from the crankshaft 146, causes a reciprocating linear motion of the shuttle of magnitude 2r, ranging from −r to +r.

Figure 10:
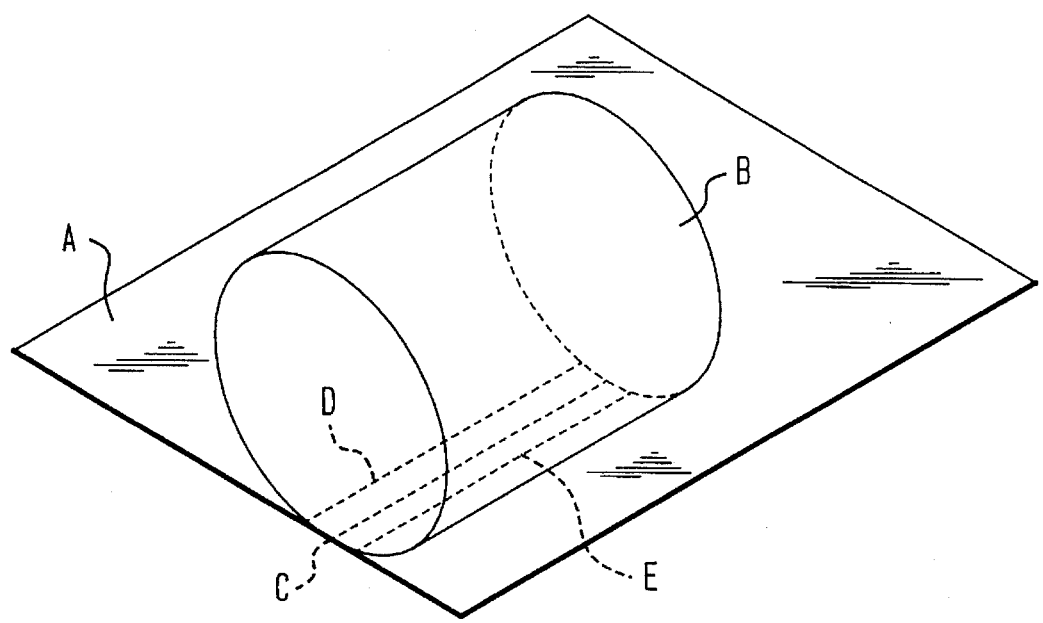
FIG. 10 is a perspective view of a prior art mechanism consisting of a cylindrical roller contacting a flat surface.

The conjugate drive mechanism of FIGS. 4–8, which share the same attributes of the conjugate drive mechanism of FIG. 1, provides several functional advantages over a roller bearing riding upon a flat surface or traditional gear shapes that otherwise might be used to intermediate between the crank and shuttle. For example, a roller bearing or wheel riding upon a flat surface could be depicted as shown in FIG. 10. In FIG. 10, the flat bearing surface A is tangent to the circumference of the wheel or roller B. As such, there is a high degree of divergence of the two surfaces with greater divergence associated with smaller circumference. If the wheel and flat bearing surface were non-deformable and/or there is no pressure urging them together, then there would be line contact between the wheel and bearing surface, as depicted by dotted line C. If the wheel is urged toward the bearing surface, and the materials exhibit normal elastic behavior, the elasticity of the materials results in a deformation in both such that there is a flattening out of the wheel and a depression of the flat surface resulting in an increase in contact area as represented by the area between dotted lines D and E. In the case of steel or other hard metals, the degree of deformation will be microscopic and will depend upon the modulus of elasticity of the material and the compressive force applied.

Figure 11:
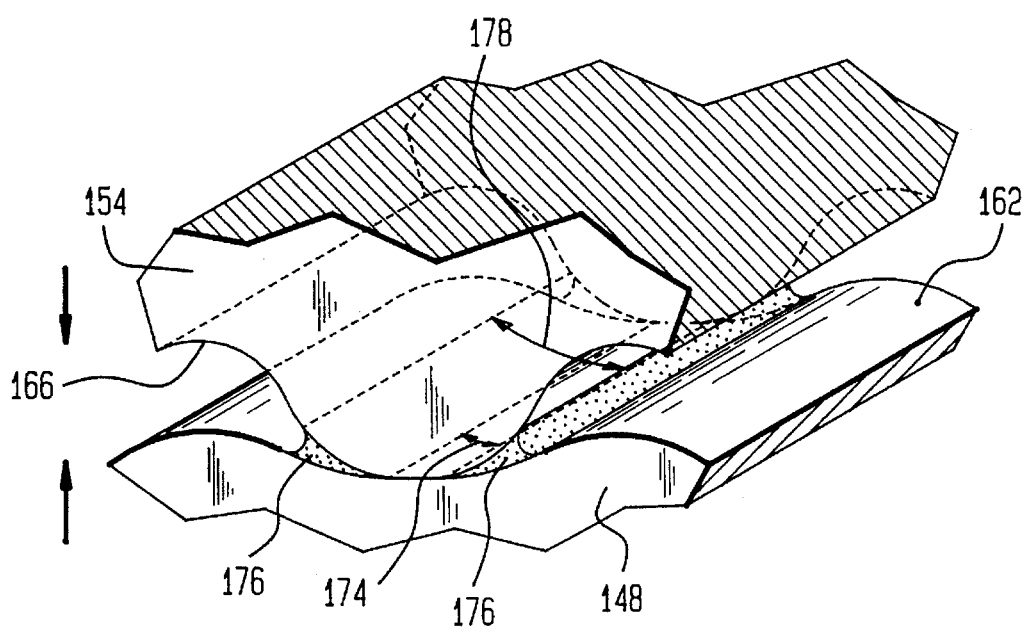
FIG. 11 is an enlarged segment of a conjugate drive mechanism of the piston device shown in FIGS. 4–9.

It can be observed in FIG. 11 that impinging curved surfaces sharing a similar average radius and direction of curvature generate a relatively wide band of effective contact area under loading forces. It should be understood that in the unloaded condition, similar but different curves will touch only along a single contact line. For example, if a cylinder is placed within a slightly larger cylinder, there can only be line contact between the cylinders at any one time (assuming no deformation). Deforming compressive forces alter this relationship significantly. FIG. 11 shows a segment of a conjugate driver, e.g., 154 impinging upon a mating portion of its corresponding bearing conjugate 148. The junction is under compressive force, as indicated by the converging arrows to the left of the drawing. Even though the curves describing the respective profiles of the conjugate driver 154 and the bearing conjugate 148 differ, they are similar. Thus, under compression, the deformation of the conjugate driver 154 and the bearing conjugate 148 results in an increase of contact area represented by the band spanned by the double-headed arrow 174. This area could be denominated the effective dry contact area under compression. The greater effective contact area experienced due to similar curved surfaces under load is a consequence of the fact that there is less distance between similarly curved surfaces than between, e.g., a curve and its tangent line. For a given deformation displacement due to metal elasticity, a larger portion of approximately parallel surfaces will come into contact than for clearly non-parallel surfaces.

Curved surfaces which tend toward parallelism are also more efficacious for establishing and maintaining a hydrodynamic wedge or film of lubricating oil between the mating surfaces. As illustrated in FIG. 11, hydrodynamic wedges of lubricant 176 not only prevent dry contact between the mating elements but also function to transfer compressive force between the converging surfaces thereby distributing the compressive force over a greater area and increasing the effective contact area. This hydrodynamic effective contact area is illustrated by double-headed arrow 178. Both the dry effective contact area 174 and the hydrodynamic effective contact area 178 will vary with the compressive force and the speed of surface conjugation.

The conjugate drive mechanism of FIGS. 4–8 exhibits mating surfaces which are more closely parallel than a tangent line to a circle. Stated another way, the average radius over a number of degrees of the "tooth" projection of the conjugate driver 154 and the average radius over the same number of degrees of the mating "tooth" depression in the bearing conjugate 148 differ only slightly. In contrast, the radius of a wheel differs by an infinite amount over the radius of a straight line which has a radius of infinite length. The practical consequence of this approximate parallelism, which exists at least over short distances, is that the deformations associated with a given load and material composition result in a greatly increased effective contact area over that of a wheel on a flat surface. One might also note that wheels, with their limited contact, concentrate the deformation forces along a narrow band of contact which results in metal fatigue and/or deformation beyond the elastic limit resulting in permanent deformation at positions of high compression (e.g., flattening of the wheel and/or bellying of the flat surface). In addition, at points in the cycle where there is light or no load on the wheel/surface interface, there can be a loss of contact or slippage such that the wheel fails to track over the bearing surface.

If conventional gearing were applied at the conjugate drive/bearing conjugate interface, it would partially solve the problem of a lack of tracking and slippage associated with wheels or rollers by exhibiting the gross mechanical interaction of interdigitation; but it would also present another set of problems. Conventional gearing typically utilizes a first rotatable member rotating about a fixed axis and having a plurality of teeth. The teeth of the first rotatable member interdigitate with the teeth of either a second rotatable member or a linearly moving rack. The teeth of the first (driver) member "paddle" against the teeth of the second (driven) member such that force is delivered by the faces of the driver gear teeth to the faces of the driven gear teeth in a direction tangent to the pitch line (i.e., circle) of the driver gear. A clearance is provided between each gear tooth tip of the first gear and the corresponding root fillet of the mating gear. There is no contact between tip and root.

In contrast, the piston engine 110 of FIGS. 4–8 is intended to transmit force between a linearly reciprocating shuttle and the crankpin of a rotating crankshaft. This force is transmitted through the trackable profile interface of the conjugate driver and bearing conjugate. The transmission of force in the piston engine 110 has significant components normal to the driver/bearing interface. Thus, the conjugate profiles are urged into compression against one another. "Paddling" type interdigitating gear teeth are not a suitable alternative for bearing compressive loads, owing, at least partially, to the clearance gap present at the tip/root interface. If interdigitating gear teeth are subjected to the forces encountered by the conjugated profiles of the piston engine 110, the interdigitating teeth of each gear would be urged toward the tip/root gap of the other gear, thereby causing a wedging action of the interdigitating teeth. This successive wedging action creates tremendous friction and an unacceptable amount of wear and could not be used in a workable device. Conventional gearing has inherent clearance and, thus, loss of contact and slippage. As described, the tip/root gap of conventional gearing does not provide an adequate load bearing support surface and indeed represents a "loss of contact". In this respect, conventional gearing exhibits an intermittent contact surface (due to the intermittent loss of contact between tip and root) in contrast to the continuous contact surface of the conjugate drive mechanism of the present invention.

As can be appreciated from the above description of FIGS. 10 and 11, the effective area of contact between the conjugate driver 154 and the bearing conjugate 148 of the piston engine 110 of FIGS. 4–8 is substantially increased over the line contact of a roller bearing (or wheel) on a tangent surface as depicted in FIG. 10. This results in the potential of the piston engine 110 to endure greater typical primary normal loading forces, thereby increasing its power density. The arrangement depicted herein (see, for instance, FIG. 11) can support greater loading forces directed along the line perpendicular to the pitch line than gear shapes which are intended to transfer torsional forces acting parallel to the pitch line. The trackable profiles of the conjugate drivers 154, 156 and bearing conjugates 148, 150 constitute the actual pitch lines and are therefore tangible rather than an intangible abstract line as in conventional gear teeth. The trackable profiles can therefore be denominated "pitch surfaces."

It should be apparent that the conjugate drivers 154, 156 and bearing conjugates 148, 150 can be configured in a variety of ways. In each instance, however, it is an objective to prevent scuffing, thereby providing an adequate load bearing support surface. Scuffing of the surfaces is avoided when the conjugate drivers 154, 156 track along the profiles of the bearing conjugates 148, 150 without loss of contact or slippage throughout the range of motion of the device. Bearing conjugates 148, 150 thus constitute trackable profiles with respect to the conjugate drivers 154, 156. In addition, one could observe that the total circumferential length of the trackable profiles of each of the bearing conjugates 148, 150 equals the total circumferential length of the corresponding profile of the conjugate drivers 154, 156, respectively.

Figure 12:
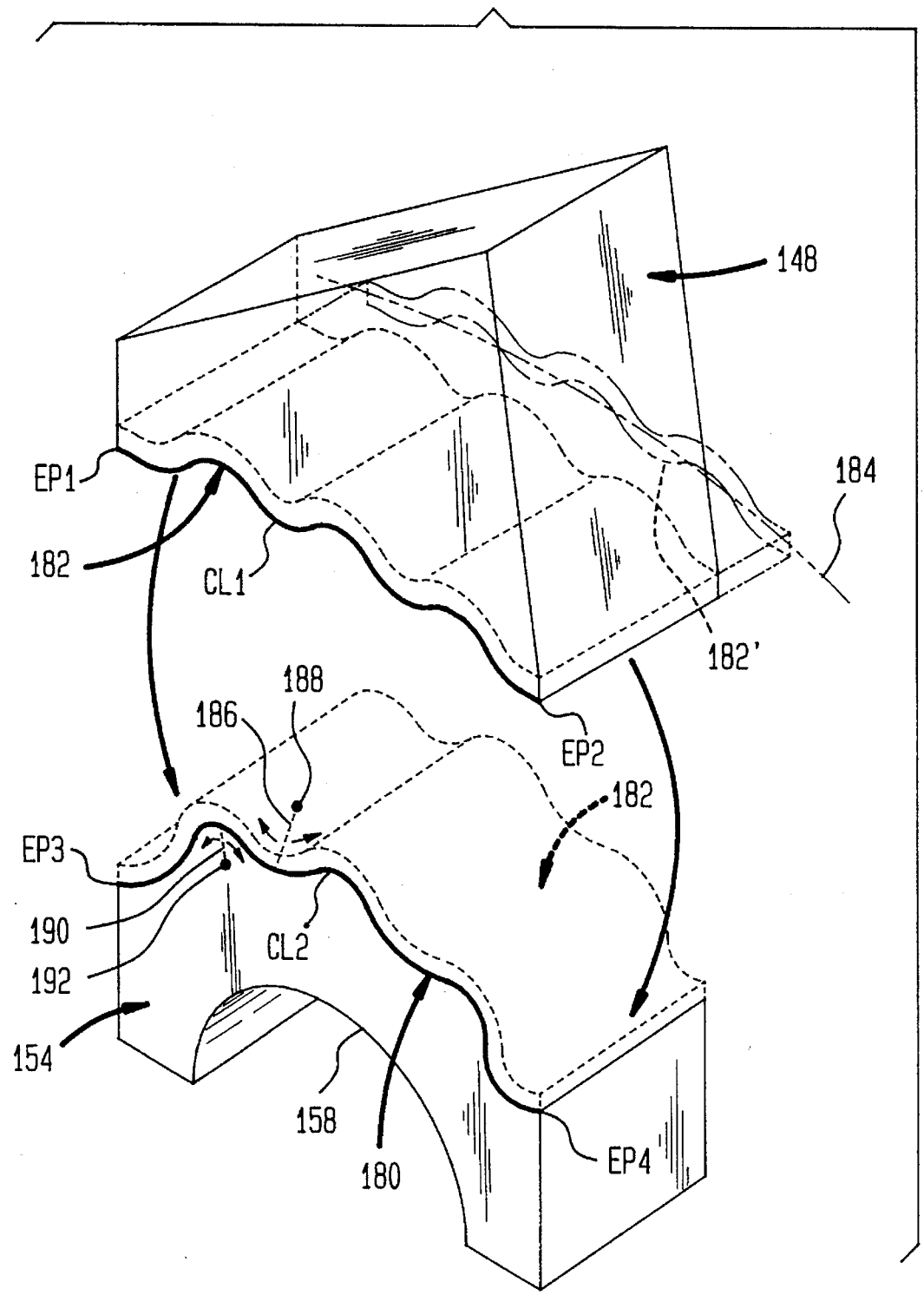
FIG. 12 is an enlarged view of a conjugate driver and mating bearing conjugate of the piston device shown in FIGS. 4–9, illustrating diagrammatically the relationship between respective mating surfaces of the conjugate driver and the bearing conjugate.

FIG. 12 illustrates the conjugate drive mechanism of FIGS. 4–8 and depicts the relationship between the conjugate driver outer surface 180 (i.e., the surface extending transversely across the conjugate driver 154 from the boldfaced curvilinear line CL2) and the bearing conjugate outer surface 182 (i.e., the surface extending transversely across the bearing conjugate 148 from the boldfaced curvilinear line CL1). Given a particular undulation pattern on either member, a mating trackable profile may be generated on the other. The undulation pattern of the bearing conjugate 148, for example, could be described as a continuous series of displacements above, on (zero displacement) and below a reference surface. An end-on cross-sectional view of this surface is a projection of the surface contour or profile of the bearing conjugate outer surface 182. Dotted line 182' can be defined as a series of displacements above, on (zero displacement) and below a reference line 184. In FIG. 12, the undulation pattern of the bearing conjugate outer surface 182 is translated or superimposed upon (see the phantom representation of the surface 182) the generally arcuate shape of the conjugate driver 154 to give the resultant contour of its outer surface 180. The undulations in the conjugate driver 154 can be defined by a series of displacements above, on (zero displacement) and below a reference surface associated with the conjugate driver 154, (not shown for simplicity of illustration), e.g., a cylindrical section parallel to the conjugate driver crank bearing surface 158. The bearing conjugate outer surface 182 has a circumferential length CL1, as measured between end points EP1, EP2. The circumferential length CL2 of the conjugate driver outer surface 180 is measured between end points EP3, EP4 and is of equal length to CL1.

A physical analogy for this conjugation relationship is that the undulating pattern of the bearing conjugate 148 is bent over the arcuate shape of the conjugate driver 154. It is not necessary that the conjugate driver's arcuate shape (i.e., its reference surface) be a simple cylinder, rather it may embody a compound and complex curvature. Similarly, the reference line 184 may be straight, a simple curve or a compound, complex curve. The shapes of the respective reference surfaces are selected to control the motion of the crankpin 144 (see FIG. 8) relative to the shuttle 134. It should be observed that in translating the undulations from the bearing conjugate 148 to the conjugate driver 154, the exterior radii, e.g., 186 from center 188 associated with the conjugate driver profile (outer surface 180) are lengthened while the interior radii, e.g., 190 from center 192 are shortened. With respect to certain profile shapes, such as, a compound complex curved surface, it is a simplification to associate a significant portion of the profile shape to a few radii. In that particular instance, the resulting profile curvature could be described as a chain of small arcs swept by numerous radii having distinct centers on either side of the profile.

Despite the change in radii, the overall circumferential length (which is represented by the boldfaced curvilinear line CL1, as measured between end points EP1, EP2) of the trackable profile of the bearing conjugate 148 remains the same after translation onto the conjugate driver 154, whereby the overall circumferential length (which is represented by the boldfaced curvilinear line CL2, as measured between end points EP3, EP4) of the trackable profile of the conjugate driver 154 equals the overall circumferential length of the bearing conjugate 148. That is, if both surfaces were straightened, they would be the same length (i.e., CL1=CL2). Owing to this relationship, the surface 180 of the conjugate driver 154 can track line-by-line over the surface 182 of the bearing conjugate 148 without slippage and without clearance. With respect to terms such as "equal" and "no clearance", the inventor herein recognizes that these conditions are achievable in the real world only to the level of precision inherent in machine tools. However, objectives of "equality", "no clearance" and "no scuffing" are clearly distinguishable, both in fact and intent, from clearances, such as the root/tip clearance, that are designed in or provided for in conventional gearing.

Figure 13:
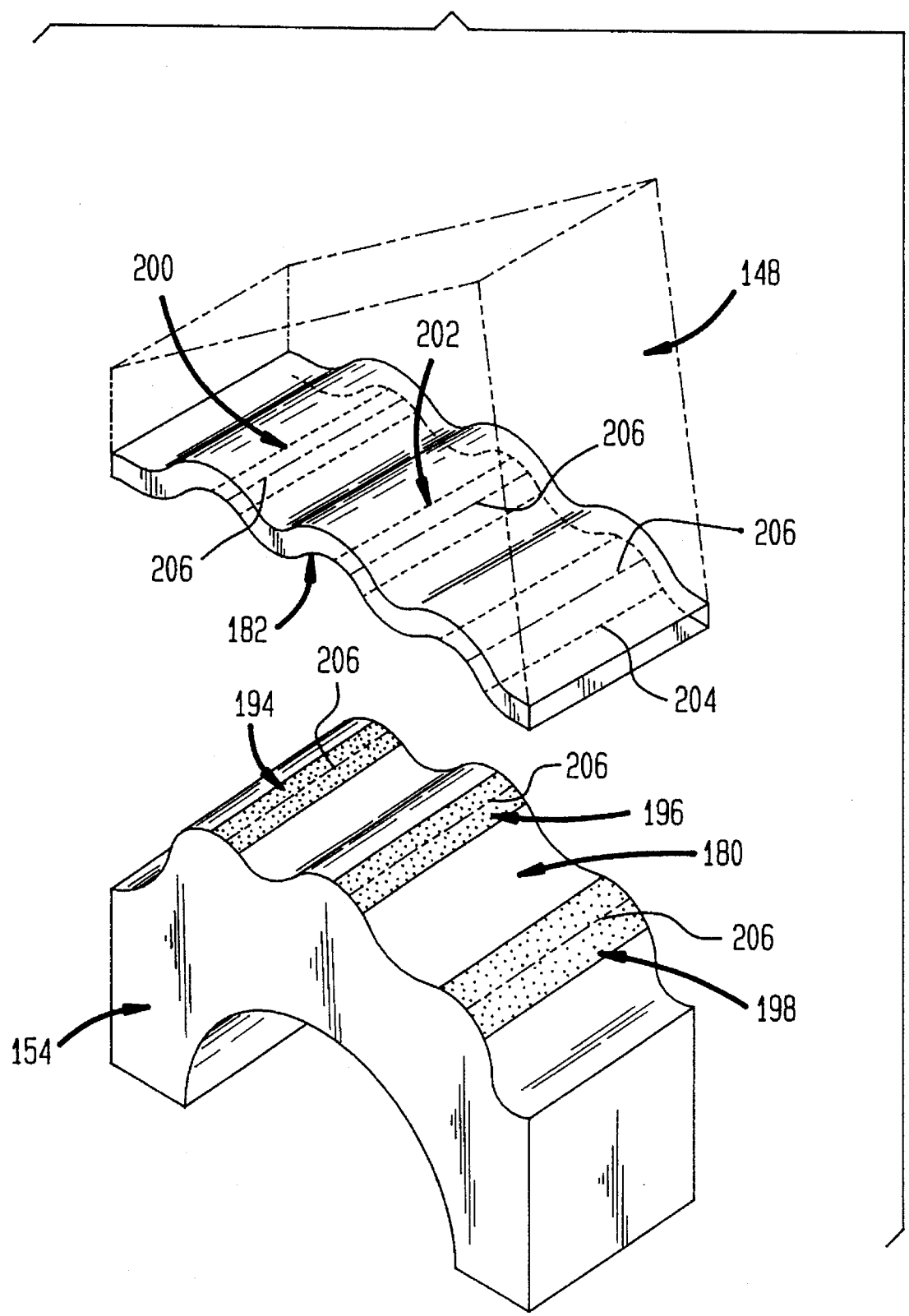
FIG. 13 is an enlarged view of the conjugate driver and mating bearing conjugate of FIG. 12 showing selected sequential contact areas.

FIG. 13 illustrates the increased dynamic effective contact area associated with the similar but unique curved surfaces of the mating conjugate driver 154 and bearing conjugate 148 (partially in phantom) under compression. The contact surfaces associated with three distinct positions occurring at distinct periods of time are illustrated. It should be understood that the three contact areas shown would not exist simultaneously as shall be further explained below. In addition, FIG. 13 depicts the tracking relationship between the conjugate driver 154 and bearing conjugate 148 (no slippage, clearance or scuffing) More specifically, in the conjugate drive mechanism of FIGS. 4–8, the correlation of line-for-line contact between the bearing conjugate 148 and the conjugate driver 154 is, under working conditions, a correlation of bands or strips of contact, when the motion conversion apparatus is operating and the interface between the conjugate driver 154 and the bearing conjugate 148 is subjected to compressive loading forces. In addition, the effective contact area is increased by the presence of a lubricant.

FIG. 13 shows a selected group of contact areas 194, 196, 198 on the conjugate driver 154 associated with discrete points in time at discrete phases of a full range of travel of the conjugate drive 154 under one set of operating conditions, e.g., engine under no load and running at 1000 RPMs. These contact areas on the conjugate driver 154 correspond with contact areas 200, 202, 204 on the bearing conjugate 148. As illustrated, the effective surface contact areas will vary depending upon variations in loading forces experienced at different degrees in the cycle. During times of extremely high loading or overload, the dry contact area may be larger. When lightly loaded, e.g., at low RPM, the effective dry surface contact approaches line contact but a more substantial effective contact area is maintained by the hydrodynamic effect of the lubricant. To illustrate the potential variations in the width of the effective contact area due to loading, area 198 is shown as being larger than area 194. To depict the distinction between the effective contact area, e.g., 198 and the line contact associated with dry unloaded operation, a dotted line 206 is drawn through each effective contact area shown. On account of its influence on the effective contact area, the lubricant may be denominated a "contact medium" or "constant contact medium."

In operation, the effective surface contact area migrates along the interface between the conjugate driver 154 and the bearing conjugate 148 as the conjugate driver 154 tracks over the bearing conjugate 148. This migration is uninterrupted due to the constant contact between the conjugated members 148, 154. One could also express this relationship by noting that there are a continuum of contact lines (only a few of which are depicted in FIG. 13 as the dotted lines 206) arranged along the entire circumferential length of the respective profiles of the conjugate driver 154 and conjugate bearing 148. Further, the respective contact lines serially contact a corresponding contact line on the mating profile as the conjugate drive progresses through its range of motion. In this manner, the entireties of the outer surfaces 180, 182 contribute to load transmission and may be said to be load transmitting surfaces. The contact areas shown in FIG. 13 represent the contact areas that would be present at three different times.

Figure 14:
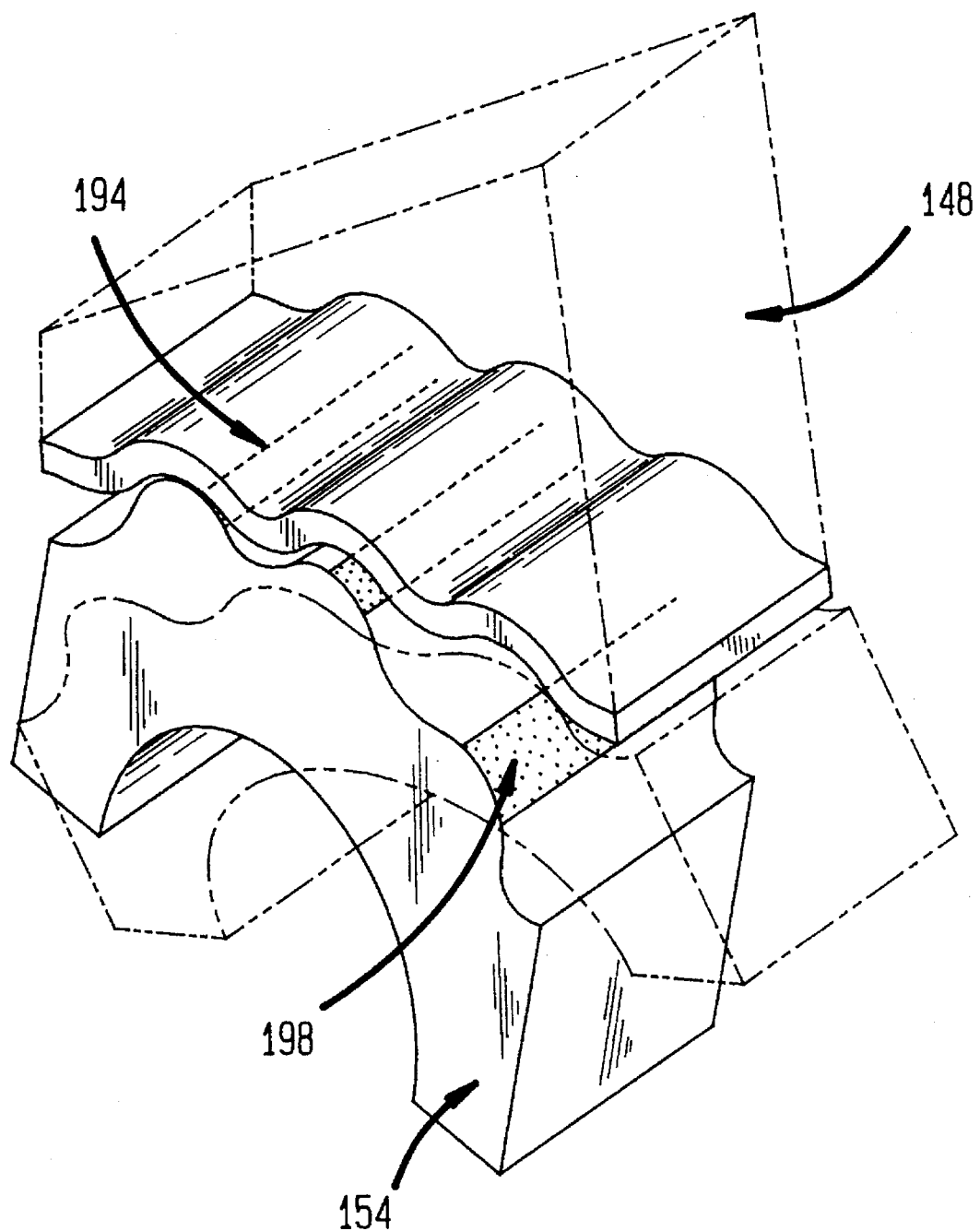
FIG. 14 is an enlarged view of the conjugate driver and mating bearing conjugate of FIG. 12 in two positions of conjugate motion.

FIG. 14 shows the rolling conjugated interaction of the bearing conjugate 148 and the conjugate driver 154. In a first position (indicated by solid lines) the conjugate driver 154 contacts the bearing conjugate 148 at contact area 194. When the conjugate driver 154 has moved into a second position (indicated by dotted lines) the area 198 on the conjugate driver 154 will be in contact with the surface of the conjugate profile of the bearing conjugate 148. The correspondence of contact areas is constant for each iteration of the conjugate drive's motion. That is, for each cycle, there is a repetition of contact area correspondence.

As described in a co-pending application, viz, Ser. No. 08/149,064, entitled Lubrication System for a Conjugate Drive Mechanism, filed Nov. 8, 1993, the maintenance of a hydrodynamic film of lubricant has notable beneficial effects and is readily achieved in the piston engine 110 of FIGS. 4–8. If a quantum of lubricant is injected between the conjugate driver and the bearing conjugate before the area of contact and preferably at a point of low loading, it will be pushed along in front of the mating interface (i.e., the migrating contact area) through the range of travel.

It may be noted that the conjugate drive mechanism of the piston engine 110 of FIGS. 4–8 has certain attributes of a wheel, in that it rolls smoothly over a support surface in line-for-line contact, without clearance gaps. It also has attributes of gears, in that the conjugate driver and the bearing conjugate exhibit a repetitive tracking mechanical interaction which prevents slippage. Unlike a gear system there is no tip-to-root clearance or a multiple set of sequentially interrupted contact surfaces. Instead the contact between the conjugate driver and the bearing conjugate is continuous. The conjugate drive also exhibits an increased contact area over either the wheel or the gear. One should further note that the tracking profiles 166, 168 of the conjugate drivers 154, 156 act as self-aligning components as they interface with their respective mating profiles 162, 164 of the bearing conjugates 148, 150.

The bearing conjugates 148, 150 and the conjugate drivers 154, 156 may be formed of hardened steel or other materials as commonly used to form gears and may include surface treatments to reduce wear, friction and production costs (e.g., electroplating, nitriding, spray dispersement and, in general, any known applicable metallurgical or coating process). The weight of the bearing conjugates 148, 150 could be reduced by forming them as a multi-material matrix of aluminum and steel or other metal or non-metal matter. The tracking surfaces of the conjugate drivers 154, 156 may be similarly enhanced by surface treatment or bonding with a friction-reducing bearing material.

The stop pads 170a, 170b can be made from a material which is the same as or different from that of the bearing conjugate 148 and/or the conjugate driver 154 and can be separate elements which are permanently and fixedly attached to the bearing conjugate 148 and/or to the conjugate driver 154. Alternatively, the stop pads 170a, 170b can be made integrally with the bearing conjugate 148 and/or with the conjugate driver 154. Further, the stop pads 170a, 170b can also be removably attached to the bearing conjugate 148 and/or to the conjugate driver 154 so that the stop pads 170a, 170b can be removed for repair, replacement, etc. The stop pads 170a, 170b can also be made adjustable by any conventional means to compensate for any wear of the stop pads 170a, 170b and/or the conjugate driver 154.

In a similar manner, the bearing conjugate 150 and/or the conjugate driver 156 could be provided with stop pads. In such a case, the motion of the conjugate drivers 154, 156 would be arrested simultaneously at each of the end points.

Figure 15:
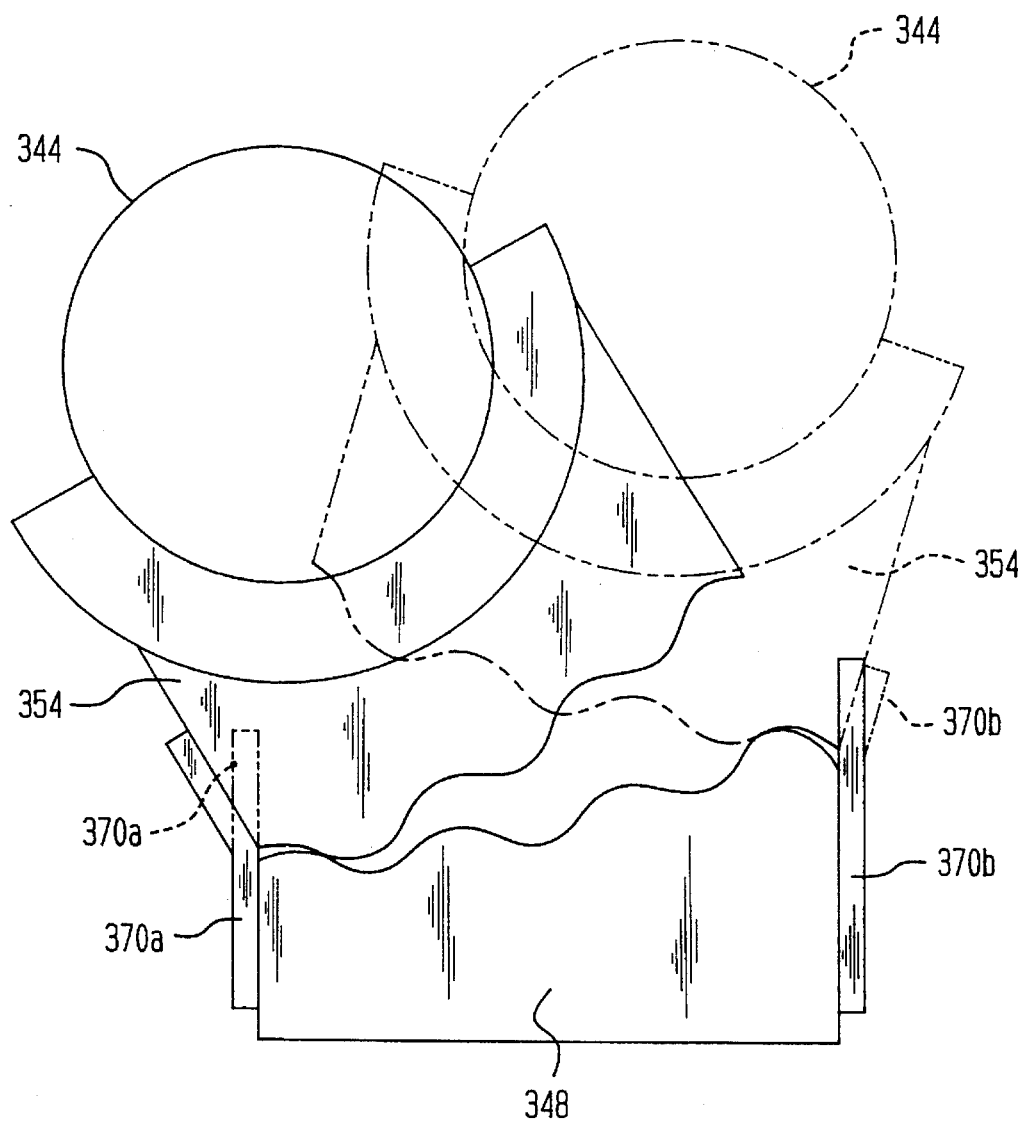
FIG. 15 is an enlarged elevational view of a modified version of the second exemplary embodiment shown in FIGS. 4–9.
Figure 16:
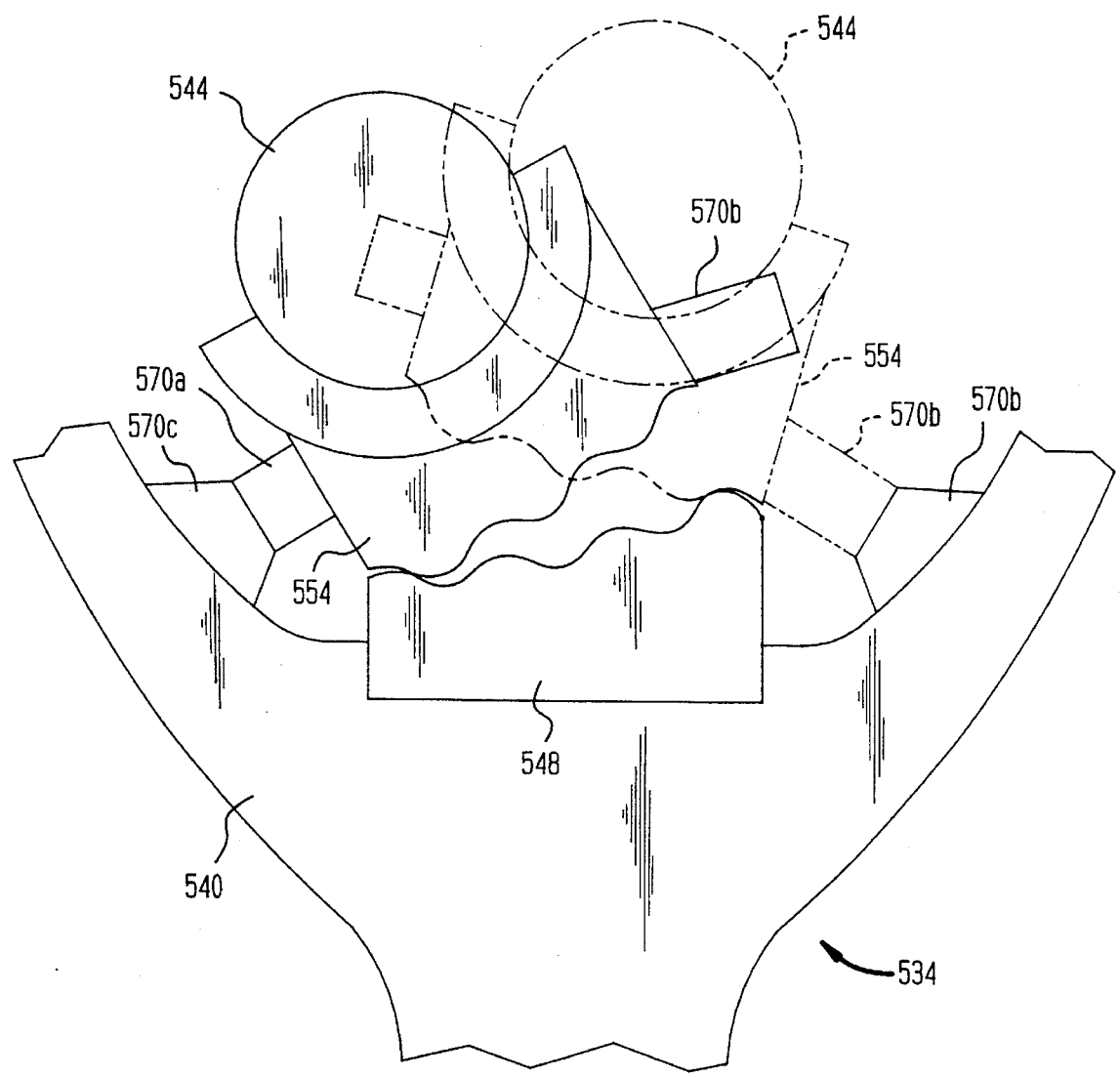
FIG. 16 is an enlarged elevational view of another modified version of the second exemplary embodiment shown in FIGS. 4–9.

FIGS. 15 and 16 depict modified versions of the motion arrester illustrated in FIGS. 4–9. In FIGS. 15 and 16, a numbering convention is employed wherein elements shown therein having a function or structure in common with a counterpart in previously discussed FIGS. 4–9 are given the same number incremented by two hundred and by four hundred, respectively.

Referring to FIG. 15, bearing conjugate 348 is provided with stop pads 370a, 370b, which are adjustably mounted on opposite sides thereof by, for instance, bolts (not shown) or any other type of conventional fastening mechanism. Each of the stop pads 370a, 370b is made from spring steel, rubber or any other suitable material having sufficient resiliency so that the stop pads 370a, 370b will deflect in response to their engagement by a corresponding side of conjugate driver 354, which is rotatably mounted on crankpin 344. More particularly, a free end of the stop pad 370a is movable between a rest position (illustrated by broken lines in FIG. 15), which it automatically assumes when not engaged by the conjugate driver 354, and a deflected position (illustrated by solid lines in FIG. 15), which it is urged into upon engagement by the conjugate driver 354. Similarly, a free end of the stop pad 370b is movable between a rest position (illustrated by solid lines in FIG. 15), which it automatically assumes when not engaged by the conjugate driver 354, and a deflected position (illustrated by broken lines in FIG. 15), which it is urged into upon engagement by a conjugate driver 354.

The stop pads 370a, 370b can be mounted on structural elements other than the bearing conjugate 348. For instance, the stop pads 370a, 370b could be mounted on an adjacent yoke portion of an associated shuttle (not shown).

Referring to FIG. 16, stop pads 570a, 570b are mounted on opposite sides of conjugate driver 554, rather than on opposite sides of bearing conjugate 548. The stop pads 570a, 570b are sized and shaped such that they are engageable with stop pads 570c, 570d, respectively, which are mounted on opposite sides of a yoke portion 540 of an associated shuttle 534. More particularly, when the conjugate driver 554 is at one of its end points of motion relative to the bearing conjugate 548, the stop pad 570a engages the stop pad 570c, while the stop pad 570b is out of engagement with the stop pad 570d (see the solid line representations of the stop pads 570a, 570b in FIG. 16). Conversely, when the conjugate driver 554 is at the other of its end points of motion relative to the bearing conjugate 548, the stop pad 570a is out of engagement with the stop pad 570c, while the stop pad 570b engages the stop pad 570d (see the broken line representations of the stop pads 570a, 570b in FIG. 16).

The stop pads 570a, 570b, as well as the stop pads 570c, 570d, can be made from steel, rubber or any other suitable material. Also, the stop pads 570c, 570d could be relocated from the yoke portion 540 of the shuttle 534 to some other adjacent structural element, such as another conjugate driver (not shown) mounted on crankpin 544. Alternatively, the stop pads 570c, 570d could be entirely eliminated.

It will be understood that the embodiments described herein are merely exemplary and that a person skilled in the art may make many variations and modifications without departing from the spirit and scope of the invention. For example, the present invention can be employed in conjunction with the motion converters disclosed in Brackett U.S. Pat. Nos. 4,590,812 and 4,779,472, provided that such motion converters are provided with a conjugate drive mechanism. All such modifications and variations are intended to be included within the scope of the invention as defined in the appended claims.

I claim:

1. A motion arrester for a conjugate drive mechanism of a scotch yoke type motion converter, comprising a linearly movable shuttle; a crankpin positioned within an aperture in said shuttle and rotatable in a circular path; a bearing conjugate having a trackable profile, which forms a portion of a peripheral boundary of said aperture and which has a first circumferential length; a conjugate driver positioned within said aperture and rotatably mounted about said crankpin, at least a portion of said conjugate driver being located between said crankpin and said bearing conjugate and having a tracking profile, which has a second circumferential length equal to said first circumferential length, said tracking profile and said trackable profile engaging each other continuously in conjugation between a first end point and a second end point as said crankpin rotates such that motion is transferable between said crankpin and said shuttle; and arresting means for arresting the motion of said conjugate driver relative to said bearing conjugate at said first end point and said second end point.

2. The motion arrester of claim 1, wherein said tracking profile has a continuum of contact lines arranged along the entire circumferential length thereof such that said contact lines serially contact corresponding contact lines on said trackable profile.

3. The motion arrester of claim 2, wherein said trackable profile constitutes a first pitch surface, and said tracking profile constitutes a second pitch surface.

4. The motion arrester of claim 2, further comprising a lubricant introduced between said trackable profile and said tracking profile, said lubricant serving to increase the effective contact area between said trackable profile and said tracking profile.

5. The motion arrester of claim 2, wherein the direction and radius of curvature of said tracking profile at said contact lines are similar to the direction and radius of curvature of said trackable profile at said corresponding contact lines.

6. The motion arrester of claim 2, wherein said trackable profile is urged into compression against said tracking profile such that at least some of said contact lines are expanded into contact bands.

7. The motion arrester of claim 2, wherein said correspondence of said contact lines of said tracking profiles to said contact lines of said trackable profiles is substantially repeated for each cycle of the motion of said conjugate driver between said first end point and said second end point.

8. The motion arrester of claim 6, wherein the width of said contact bands depends upon the compressive loading of the interface between said tracking profile and said trackable profile and the modulus of elasticity of said tracking profile and said trackable profile.

9. The motion arrester of claim 1, wherein said arresting means includes first arresting means for arresting the motion of said conjugate driver relative to said bearing conjugate at said first end point and second arresting means for arresting the motion of said conjugate driver relative to said bearing conjugate at said second end point.

10. The motion arrester of claim 9, wherein said trackable profile includes a first set of undulations and said tracking profile includes a second set of undulations, said first set of undulations being in constant mating engagement with said second set of undulations.

11. The motion arrester of claim 10, wherein said first set of undulations and said second set of undulations are uniform.

12. The motion arrester of claim 10, wherein there is no tip-root clearance between one of said first set of undulations and a corresponding one of said second set of undulations.

13. The motion arrester of claim 10, wherein said first arresting means includes a first stop pad provided on at least one undulation of one of said first and second sets of undulations; and wherein said second arresting means includes a second stop pad provided on at least another undulation of one of said first and second sets of undulations.

14. The motion arrester of claim 13, wherein said first and second stop pads are provided on said conjugate driver.

15. The motion arrester of claim 13, wherein said first and second stop pads are provided on said bearing conjugate.

16. The motion arrester of claim 1, wherein the conjugate drive mechanism includes a pair of conjugate drivers and a pair of bearing conjugates formed on opposing portions of said peripheral boundary of said aperture, each of said pair of conjugate drivers being rotatable about said crankpin and independently articulatable through a selected range of degrees, one of said pair of conjugate drivers being in constant mating engagement with one of said pair of bearing conjugates between a first end point and a second end point, and another of said pair of conjugate drivers being in constant mating engagement with another of said pair of bearing conjugates between a third end point and a fourth end point, whereby motion is continuously transferable between said crankpin and said shuttle through said pair of conjugate drivers and said pair of bearing conjugates; and wherein said arresting means includes first arresting means for arresting the motion of said one conjugate driver relative to said one bearing conjugate at said first and second end points and second arresting means for arresting the motion of said another conjugate driver relative to said another bearing conjugate at said third and fourth end points.

17. The motion arrester of claim 16, wherein said one bearing conjugate includes a first set of undulations and said one conjugate driver includes a second set of undulations, said first set of undulations being in constant mating engagement with said second set of undulations; and wherein said another bearing conjugate includes a third set of undulations and said another conjugate driver includes a fourth set of undulations, said third set of undulations being in constant mating engagement with said fourth set of undulations.

18. The motion arrester of claim 17, wherein said first arresting means includes a first stop pad provided on at least one undulation of one of said first and second sets of undulations and a second stop pad provided on at least another undulation of one of said first and second sets of undulations; and wherein said second arresting means includes a third stop pad provided on at least one undulation of one of said third and fourth sets of undulations and a fourth stop pad provided on at least another undulation of one of said third and fourth sets of undulations.

19. The motion arrester of claim 18, wherein said first and second stop pads are provided on said one bearing conjugate; and wherein said third and fourth stop pads are provided on said another bearing conjugate.

20. The motion arrester of claim 17, wherein said first arresting means includes a first pair of stop pads mounted on opposite sides of one of said one bearing conjugate and said one conjugate driver; and wherein said second arresting means includes a second pair of stop pads mounted on opposite sides of one of said another bearing conjugate and said another conjugate driver.

21. The motion arrester of claim 20, wherein said first arresting means further includes a third pair of stop pads mounted on said shuttle such that each stop pad of said third pair of stop pads is engageable by a corresponding one of said stop pads of said first pair of stop pads; and wherein said second arresting means further includes a fourth pair of stop pads mounted on said shuttle such that each stop pad of said fourth pair of stop pads is engageable by a corresponding one of said stop pads of said second pair of stop pads.

22. The motion arrester of claim 1, wherein said trackable profile and said tracking profile are formed from a chain of arcs swept by corresponding radii having distinct centers of curvature disposed on either side of an associated profile.

23. The motion arrester of claim 1, wherein said trackable profile constitutes a first pitch surface, and said tracking profile constitutes a second pitch surface.

24. The motion arrester of claim 1, wherein the conjugate drive mechanism includes a pair of conjugate drivers rotatably mounted alongside each other on said crankpin and a pair of bearing conjugates formed on opposing portions of said peripheral boundary of said aperture, one of said pair of bearing conjugates being in constant mating engagement with one of said pair of conjugate drivers as said one conjugate driver moves back and forth along said one bearing conjugate between a first end point and a second end point, and another of said pair of bearing conjugates opposing and being offset relative to said one bearing conjugate, said another bearing conjugate being in constant mating engagement with another of said pair of conjugate drivers as said another conjugate driver moves back and forth along said another bearing conjugate between a third end point and a fourth end point, whereby motion is continuously transferable between said crankpin and said shuttle through said pair of conjugate drivers and said pair of bearing conjugates; and wherein said arresting means includes first arresting means for arresting the motion of said one conjugate driver relative to said one bearing conjugate at said first and second end points and second arresting means for arresting the motion of said another conjugate driver relative to said another bearing conjugate at said third and fourth end points.

25. The motion arrester of claim 24 wherein said one bearing conjugate includes a first set of undulations and said one conjugate driver includes a second set of undulations, said first set of undulations being in constant mating engagement with said second set of undulations; wherein said another bearing conjugate includes a third set of undulations and said another conjugate driver includes a fourth set of undulations, said third set of undulations being in constant mating engagement with said fourth set of undulations; wherein said first arresting means includes a first stop pad provided on at least one undulation of one of said first and second sets of undulations and a second stop pad provided on at least another undulation of one of said first and second sets of undulations; and wherein said second arresting means includes a third stop pad provided on at least one undulation of one of said third and fourth sets of undulations and a fourth stop pad provided on at least another undulation of one of said third and fourth sets of undulations.

26. The motion arrester of claim 25, wherein said first and second stop pads are provided on said one bearing conjugate; and wherein said third and fourth stop pads are provided on said another bearing conjugate.

27. A motion arrester for a conjugate drive mechanism of a scotch yoke type motion converter, comprising a linearly movable shuttle; a crankpin positioned within an aperture in said shuttle and rotatable in a circular path; a bearing conjugate having a trackable profile, which forms a portion of a peripheral boundary of said aperture; a conjugate driver positioned within said aperture and rotatably mounted about said crankpin, at least a portion of said conjugate driver being located between said crankpin and said bearing conjugate and having a tracking profile, said tracking profile and said trackable profile engaging each other continuously in conjugation between a first end point and a second end point as said crankpin rotates such that motion is transferable between said crankpin and said shuttle, said tracking profile having a continuum of contact lines arranged along the entire circumferential length thereof such that said contact lines serially contact corresponding contact lines on said trackable profile; and arresting means for arresting the motion of said conjugate driver relative to said bearing conjugate at said first end point and said second end point.

28. The motion arrester of claim 27, wherein said trackable profile constitutes a first pitch surface, and said tracking profile constitutes a second pitch surface.

29. The motion arrester of claim 27, wherein the conjugate drive mechanism includes a pair of conjugate drivers and a pair of bearing conjugates formed on opposing portions of said peripheral boundary of said aperture, each of said pair of conjugate drivers being rotatable about said crankpin and independently articulatable through a selected range of degrees, one of said pair of conjugate drivers being in constant mating engagement with one of said pair of bearing conjugates between a first end point and a second end point, and another of said pair of conjugate drivers being in constant mating engagement with another of said pair of bearing conjugates between a third end point and a fourth end point, whereby motion is continuously transferable between said crankpin and said shuttle through said pair of conjugate drivers and said pair of bearing conjugates; and wherein said arresting means includes first arresting means for arresting the motion of said one conjugate driver relative to said one bearing conjugate at said first and second end points and second arresting means for arresting the motion of said another conjugate driver relative to said another bearing conjugate at said third and fourth end points.

30. The motion arrester of claim 29, wherein said one bearing conjugate includes a first set of undulations and said one conjugate driver includes a second set of undulations, said first set of undulations being in constant mating engagement with said second set of undulations; wherein said another bearing conjugate includes a third set of undulations and said another conjugate driver includes a fourth set of undulations, said third set of undulations being in constant mating engagement with said fourth set of undulations; wherein said first arresting means includes a first stop pad provided on at least one undulation of one of said first and second sets of undulations and a second stop pad provided on at least another undulation of one of said first and second sets of undulations; and wherein said second arresting means includes a third stop pad provided on at least one undulation of one of said third and fourth sets of undulations and a fourth stop pad provided on at least another undulation of one of said third and fourth sets of undulations.

31. The motion arrester of claim 27, wherein the conjugate drive mechanism includes a pair of conjugate drivers rotatably mounted alongside each other on said crankpin and a pair of bearing conjugates formed on opposing portions of said peripheral boundary of said aperture, one of said pair of bearing conjugates being in constant mating engagement with one of said pair of conjugate drivers as said one conjugate driver moves back and forth along said one bearing conjugate between a first end point and a second end point, and another of said pair of bearing conjugates opposing and being offset relative to said one bearing conjugate, said another bearing conjugate being in constant mating engagement with another of said pair of conjugate drivers as said another conjugate driver moves back and forth along said another bearing conjugate between a third end point and a fourth end point, whereby motion is continuously transferable between said crankpin and said shuttle through said pair of conjugate drivers and said pair of bearing conjugates; and wherein said arresting means includes first arresting means for arresting the motion of said one conjugate driver relative to said one bearing conjugate at said first and second end points and second arresting means for arresting the motion of said another conjugate driver relative to said another bearing conjugate at said third and fourth end points.

32. The motion arrester of claim 31, wherein said one bearing conjugate includes a first set of undulations and said one conjugate driver includes a second set of undulations, said first set of undulations being in constant mating engagement with said second set of undulations; wherein said another bearing conjugate includes a third set of undulations and said another conjugate driver includes a fourth set of undulations, said third set of undulations being in constant mating engagement with said fourth set of undulations; wherein said first arresting means includes a first stop pad provided on at least one undulation of one of said first and second sets of undulations and a second stop pad provided on at least another undulation of one of said first and second sets of undulations; and wherein said second arresting means includes a third stop pad provided on at least one undulation of one of said third and fourth sets of undulations and a fourth stop pad provided on at least another undulation of one of said third and fourth sets of undulations.

33. The motion arrester of claim 17, wherein said arresting means includes first arresting means for arresting the motion of said conjugate driver relative to said bearing conjugate at said first end point and second arresting means for arresting the motion of said conjugate driver relative to said bearing conjugate at said second end point.

34. The motion arrester of claim 33, wherein said trackable profile includes a first set of undulations and said tracking profile includes a second set of undulations, said first set of undulations being in constant mating engagement with said second set of undulations; wherein said first arresting means includes a first stop pad provided on at least one undulation of one of said first and second sets of undulations; and wherein said second arresting means includes a second stop pad provided on at least another undulation of one of said first and second sets of undulations.

35. The motion arrester of claim 27, wherein said correspondence of said contact lines of said tracking profiles to said contact lines of said trackable profiles is substantially repeated for each cycle of the motion of said conjugate driver between said first end point and said second end point.

36. The motion arrester of claim 27, wherein said pair of trackable profiles and said pair of tracking profiles are formed from a chain of arcs swept by corresponding radii having distinct centers of curvature disposed on either side of an associated profile.

37. The motion arrester of claim 27, wherein said trackable profile is urged into compression against said tracking profile such that at least some of said contact lines are expanded into contact bands, the width of said contact bands depending upon the compressive loading of the interface between said tracking profile and said trackable profile and upon the modulus of elasticity of said tracking profile and said trackable profile.

38. The motion arrester of claim 37, wherein the direction and radius of curvature of said tracking profile at said contact lines are similar to the direction and radius of curvature of said trackable profile at said corresponding contact lines.

39. A motion arrester for a conjugate drive mechanism of a scotch yoke type motion converter, comprising a linearly movable shuttle; a crankpin positioned within an aperture in said shuttle and rotatable in a circular path; a bearing conjugate having a trackable profile, which constitutes a first pitch surface and which forms a portion of a peripheral boundary of said aperture; a conjugate driver positioned within said aperture and rotatably mounted about said crankpin, at least a portion of said conjugate driver being located between said crankpin and said bearing conjugate and having a tracking profile, which constitutes a second pitch surface, said tracking profile and said trackable profile engaging each other continuously in conjugation between a first end point and a second end point as said crankpin rotates such that motion is transferable between said crankpin and said shuttle; and arresting means for arresting the motion of said conjugate driver relative to said bearing conjugate at said first end point and said second end point.

40. The motion arrester of claim 39, wherein said arresting means includes first arresting means for arresting the motion of said conjugate driver relative to said bearing conjugate at said first end point and second arresting means for arresting the motion of said conjugate driver relative to said bearing conjugate at said second end point.

41. The motion arrester of claim 40, wherein said trackable profile includes a first set of undulations and said tracking profile includes a second set of undulations, said first set of undulations being in constant mating engagement with said second set of undulations.

42. The motion arrester of claim 41, wherein the average pitch line of said second set of undulations is concentric with the axis of rotation of said conjugate driver.

43. The motion arrester of claim 41, wherein the average pitch line of said second set of undulations is eccentric with the axis of rotation of said conjugate driver.

44. The motion arrester of claim 41, wherein there is no tip-root clearance between one of said first set of undulations and a corresponding one of said second set of undulations.

45. The motion arrester of claim 39, wherein the conjugate drive mechanism includes a pair of conjugate drivers and a pair of bearing conjugates formed on opposing portions of said peripheral boundary of said aperture, each of said pair of conjugate drivers being rotatable about said crankpin and independently articulatable through a selected range of degrees, one of said pair of conjugate drivers being in constant mating engagement with one of said pair of bearing conjugates between a first end point and a second end point, and another of said pair of conjugate drivers being in constant mating engagement with another of said pair of bearing conjugates between a third end point and a fourth end point, whereby motion is continuously transferable between said crankpin and said shuttle through said pair of conjugate drivers and said pair of bearing conjugates; and wherein said arresting means includes first arresting means for arresting the motion of said one conjugate driver relative to said one bearing conjugate at said first and second end points and second arresting means for arresting the motion of said another conjugate driver relative to said another bearing conjugate at said third and fourth end points.

46. The motion arrester of claim 45, wherein said one bearing conjugate includes a first set of undulations and said one conjugate driver includes a second set of undulations, said first set of undulations being in constant mating engagement with said second set of undulations; wherein said another bearing conjugate includes a third set of undulations and said another conjugate driver includes a fourth set of undulations, said third set of undulations being in constant mating engagement with said fourth set of undulations; wherein said first arresting means includes a first stop pad provided on at least one undulation of one of said first and second sets of undulations and a second stop pad provided on at least another undulation of one of said first and second sets of undulations; and wherein said second arresting means includes a third stop pad provided on at least one undulation of one of said third and fourth sets of undulations and a fourth stop pad provided on at least another undulation of one of said third and fourth sets of undulations.

47. The motion arrester of claim 39, wherein said trackable profile and said tracking profile are formed from a chain of arcs swept by corresponding radii having distinct centers of curvature disposed on either side of an associated profile.

48. The motion arrester of claim 39, wherein the conjugate drive mechanism includes a pair of conjugate drivers rotatably mounted alongside each other on said crankpin and a pair of bearing conjugates formed on opposing portions of said peripheral boundary of said aperture, one of said pair of bearing conjugates being in constant mating engagement with one of said pair of conjugate drivers as said one conjugate driver moves back and forth along said one bearing conjugate between a first end point and a second end point, and another of said pair of bearing conjugates opposing and being offset relative to said one bearing conjugate, said another bearing conjugate being in constant mating engagement with another of said pair of conjugate drivers as said another conjugate driver moves back and forth along said another bearing conjugate between a third end point and a fourth end point, whereby motion is continuously transferable between said crankpin and said shuttle through said pair of conjugate drivers and said pair of bearing conjugates; and wherein said arresting means includes first arresting means for arresting the motion of said one conjugate driver relative to said one bearing conjugate at said first and second end points and second arresting means for arresting the motion of said another conjugate driver relative to said another bearing conjugate at said third and fourth end points.

49. The motion arrester of claim 48, wherein said one bearing conjugate includes a first set of undulations and said one conjugate driver includes a second set of undulations, said first set of undulations being in constant mating engagement with said second set of undulations; wherein said another bearing conjugate includes a third set of undulations and said another conjugate driver includes a fourth set of undulations, said third set of undulations being in constant mating engagement with said fourth set of undulations; wherein said first arresting means includes a first stop pad provided on at least one undulation of one of said first and second sets of undulations and a second stop pad provided on at least another undulation of one of said first and second sets of undulations; and wherein said second arresting means includes a third stop pad provided on at least one undulation of one of said third and fourth sets of undulations and a fourth stop pad provided on at least another undulation of one of said third and fourth sets of undulations.

\* \* \* \* \*